US011959601B2

(12) United States Patent
Zhang et al.

(10) Patent No.: US 11,959,601 B2
(45) Date of Patent: Apr. 16, 2024

(54) LAMP MODULE GROUP

(71) Applicant: Lumien Enterprise, Inc., Kennesaw, GA (US)

(72) Inventors: Haicheng Zhang, Acworth, GA (US); Honggui Xie, Nanjing (CN); Zhengen Li, Heze (CN)

(73) Assignee: Lumien Enterprise, Inc., Kennesaw, GA (US)

(*) Notice: Subject to any disclaimer, the term of this patent is extended or adjusted under 35 U.S.C. 154(b) by 0 days.

(21) Appl. No.: 17/895,557

(22) Filed: Aug. 25, 2022

(65) Prior Publication Data

US 2022/0412517 A1 Dec. 29, 2022

Related U.S. Application Data

(63) Continuation of application No. 17/463,086, filed on Aug. 31, 2021, now Pat. No. 11,466,821, which is a
(Continued)

(30) Foreign Application Priority Data

Dec. 31, 2019 (CN) ........................ 201911420142.2

(51) Int. Cl.
*F21S 2/00* (2016.01)
*F21V 17/12* (2006.01)
(Continued)

(52) U.S. Cl.
CPC .............. *F21S 2/005* (2013.01); *F21V 17/12* (2013.01); *F21V 23/003* (2013.01); *F21V 23/06* (2013.01);
(Continued)

(58) Field of Classification Search
CPC ........ F21S 2/005; F21V 17/12; F21V 23/003; F21V 23/06; F21V 29/56; F21V 31/005;
(Continued)

(56) References Cited

U.S. PATENT DOCUMENTS 1,180,658 A * 4/1916 Kratz ...................... F21V 15/01 362/368
2,668,901 A 2/1954 Austin
(Continued)

FOREIGN PATENT DOCUMENTS

AT 445810 10/2009
CH 607571 8/1978
(Continued)

OTHER PUBLICATIONS

ANSI; Article entitled: "Degrees of Protection Provided by Enclosures (IP Code)", NFMA Standards Publication, Copyright 2004, 27 pgs.
(Continued)

*Primary Examiner* — Tsion Tumebo
(74) *Attorney, Agent, or Firm* — Taylor English Duma LLP

(57) ABSTRACT

A lighting assembly can include a lamp module group including a first housing defining a protruding column, the first housing defining a cavity, the first housing defining a housing opening to the cavity positioned opposite from the protruding column; a power supply driving module positioned within the cavity; and a first concentric terminal connected in electrical communication with the power supply driving module, the first concentric terminal extending through the protruding column; and a second housing including a second concentric terminal, the second housing receiving a portion of the first housing, the second concentric terminal connected in electrical communication with the
(Continued)

first concentric terminal, the second concentric terminal configured to supply power to the power supply driving module through the first concentric terminal.

20 Claims, 7 Drawing Sheets

Related U.S. Application Data continuation of application No. 16/645,458, filed as application No. PCT/CN2020/070502 on Jan. 6, 2020, now Pat. No. 11,162,651.

(51) Int. Cl.
*F21V 23/00* (2015.01)
*F21V 23/06* (2006.01)
*F21V 29/56* (2015.01)
*F21V 31/00* (2006.01)
*F21Y 115/10* (2016.01)

(52) U.S. Cl.
CPC ............ *F21V 29/56* (2015.01); *F21V 31/005* (2013.01); *F21Y 2115/10* (2016.08)

(58) Field of Classification Search
CPC .......... F21V 3/00; F21V 5/04; F21V 19/0055; F21V 29/67; F21V 31/04; F21V 3/02; F21V 7/00; F21V 15/01; F21V 23/002; F21Y 2115/10; F21K 9/20
See application file for complete search history.

(56) References Cited

U.S. PATENT DOCUMENTS

| | | | | |
|---|---|---|---|---|
| 2,738,756 | A | 3/1956 | Doane | |
| 3,104,064 | A | 9/1963 | Bellek | |
| 4,153,149 | A | 5/1979 | Weber | |
| 4,164,136 | A | 8/1979 | Wiggins et al. | |
| 4,186,851 | A | 2/1980 | Cantor | |
| 4,495,463 | A | 1/1985 | Milkovic | |
| 4,530,039 | A | 7/1985 | Shin-Shi | |
| 4,596,449 | A | 6/1986 | Iwata et al. | |
| 4,739,457 | A | 4/1988 | Orr | |
| 4,831,664 | A | 5/1989 | Suda | |
| 4,853,722 | A | 8/1989 | Gell, Jr. | |
| 4,963,798 | A | 10/1990 | McDermott | |
| 5,161,883 | A | 11/1992 | Gordin et al. | |
| 5,249,109 | A | 9/1993 | Denison et al. | |
| 5,260,858 | A | 11/1993 | Maglica | |
| 5,319,959 | A | 6/1994 | Cooper et al. | |
| 5,331,523 | A | 7/1994 | Delzer | |
| 5,373,427 | A | 12/1994 | McLean | |
| 5,420,766 | A | 5/1995 | Hollis | |
| 5,454,611 | A | 10/1995 | Wanat | |
| 5,513,085 | A | 4/1996 | Bourne | |
| 5,570,949 | A * | 11/1996 | Chiang | F21V 21/32 362/198 |
| 5,571,278 | A | 11/1996 | Chiang | |
| 5,584,568 | A | 12/1996 | Corbasson et al. | |
| 5,825,308 | A | 10/1998 | Rosenberg | |
| 5,826,971 | A | 10/1998 | Kibler | |
| 5,904,417 | A | 5/1999 | Hewett | |
| 5,941,629 | A | 8/1999 | Tuscher | |
| D424,731 | S | 5/2000 | Landefeld | |
| 6,092,914 | A | 7/2000 | Esakoff et al. | |
| 6,113,252 | A | 9/2000 | Arlitt et al. | |
| 6,161,948 | A | 12/2000 | Hagen | |
| 6,290,368 | B1 | 9/2001 | Lehrer | |
| 6,361,183 | B1 | 3/2002 | Maglica | |
| 6,390,647 | B1 | 5/2002 | Shaefer | |
| 6,525,414 | B2 | 2/2003 | Shiraishi et al. | |
| 6,527,402 | B1 | 3/2003 | Borri | |
| 6,586,890 | B2 | 7/2003 | Min et al. | |
| 6,612,720 | B1 | 9/2003 | Beadle | |
| 6,633,110 | B2 | 10/2003 | McGuire et al. | |
| 6,641,283 | B1 | 11/2003 | Bohler | |
| 6,652,113 | B2 | 11/2003 | Tant | |
| 6,676,270 | B2 | 1/2004 | Kostal et al. | |
| 6,679,315 | B2 | 1/2004 | Cosley et al. | |
| 6,756,663 | B2 | 6/2004 | Shiraishi et al. | |
| 6,764,197 | B1 | 7/2004 | Zemar | |
| 6,806,659 | B1 | 10/2004 | Mueller et al. | |
| 6,874,910 | B2 | 4/2005 | Sugimoto et al. | |
| 6,883,941 | B2 | 4/2005 | Cutting | |
| 7,015,825 | B2 | 3/2006 | Callahan | |
| 7,038,399 | B2 | 5/2006 | Lys et al. | |
| 7,041,901 | B2 | 5/2006 | Case | |
| 7,063,553 | B1 * | 6/2006 | Mullen | F21V 19/006 439/336 |
| 7,084,353 | B1 | 8/2006 | Downes | |
| 7,109,668 | B2 | 9/2006 | Pogodayev et al. | |
| 7,160,001 | B2 | 1/2007 | Bartlett | |
| 7,163,313 | B2 | 1/2007 | Rosenberg | |
| 7,178,937 | B2 | 2/2007 | McDermott | |
| 7,192,162 | B2 | 3/2007 | Tanaka et al. | |
| 7,204,608 | B2 | 4/2007 | Beeman et al. | |
| 7,233,115 | B2 | 6/2007 | Lys | |
| 7,262,559 | B2 | 8/2007 | Tripathi | |
| 7,326,179 | B1 | 2/2008 | Cienfuegos | |
| 7,358,679 | B2 | 4/2008 | Lys et al. | |
| 7,445,365 | B1 | 11/2008 | Hsu | |
| 7,452,099 | B2 | 11/2008 | Evans et al. | |
| 7,513,661 | B2 | 4/2009 | Hamada et al. | |
| 7,534,975 | B1 | 5/2009 | Sarrah et al. | |
| 7,547,113 | B2 | 6/2009 | Lee | |
| 7,549,766 | B2 | 6/2009 | Sharrah et al. | |
| 7,625,101 | B2 | 12/2009 | Alessio | |
| 7,722,216 | B2 | 5/2010 | Amor et al. | |
| 7,733,659 | B2 | 6/2010 | Snider et al. | |
| 7,736,025 | B2 | 6/2010 | Hofmann et al. | |
| 7,738,235 | B2 | 6/2010 | Gloisten et al. | |
| 7,837,866 | B2 | 11/2010 | Burrows | |
| 7,847,486 | B2 | 12/2010 | Ng | |
| 7,872,259 | B2 | 1/2011 | Den et al. | |
| 7,874,717 | B1 | 1/2011 | Shaefer | |
| 7,896,524 | B2 | 3/2011 | Yoneda et al. | |
| 7,922,353 | B2 | 4/2011 | Isely | |
| 8,066,396 | B2 | 11/2011 | Hunt | |
| 8,070,328 | B1 | 12/2011 | Koble | |
| 8,096,674 | B2 | 1/2012 | Matthews et al. | |
| 8,138,690 | B2 | 3/2012 | Chemel et al. | |
| 8,148,912 | B2 | 4/2012 | Kim | |
| 8,162,502 | B1 | 4/2012 | Zadro | |
| 8,172,434 | B1 | 5/2012 | Olsson | |
| 8,220,970 | B1 | 7/2012 | Khazi et al. | |
| 8,235,539 | B2 | 8/2012 | Thomas et al. | |
| 8,337,049 | B2 | 12/2012 | Shida et al. | |
| 8,403,530 | B2 | 3/2013 | Singer et al. | |
| 8,419,218 | B2 | 4/2013 | Dassanayake et al. | |
| 8,575,641 | B2 | 11/2013 | Zimmerman et al. | |
| 8,598,793 | B2 | 12/2013 | Yan et al. | |
| 8,632,196 | B2 | 1/2014 | Tong et al. | |
| 8,651,704 | B1 | 2/2014 | Gordin et al. | |
| 8,662,709 | B2 | 3/2014 | Chang | |
| 8,704,262 | B2 | 4/2014 | Livesay et al. | |
| 8,708,535 | B2 | 4/2014 | Dalsgaard | |
| 8,773,024 | B2 | 7/2014 | Yan et al. | |
| 8,827,512 | B1 | 9/2014 | Beadle | |
| 8,882,284 | B2 | 11/2014 | Tong et al. | |
| 8,905,587 | B1 | 12/2014 | Bouckaert | |
| 8,919,026 | B2 | 12/2014 | Hamilton | |
| 8,926,121 | B2 | 1/2015 | Wu | |
| 8,926,145 | B2 | 1/2015 | Lynch et al. | |
| 8,931,933 | B2 | 1/2015 | Tong et al. | |
| 8,936,472 | B1 | 1/2015 | Gibboney, Jr. | |
| 8,950,895 | B2 | 2/2015 | Vinther et al. | |
| 8,950,907 | B2 | 2/2015 | Packard et al. | |
| 8,967,497 | B2 | 3/2015 | Luettgen et al. | |
| 9,028,086 | B2 | 5/2015 | Woo et al. | |
| 9,062,830 | B2 | 6/2015 | Le et al. | |
| 9,115,857 | B2 | 8/2015 | Beausoleil | |
| 9,140,414 | B1 | 9/2015 | Beausoleil | |

(56) References Cited

U.S. PATENT DOCUMENTS

| | | | | |
|---|---|---|---|---|
| 9,140,431 | B1 | 9/2015 | Lee | |
| 9,168,495 | B2 | 10/2015 | Connors | |
| 9,169,997 | B2 | 10/2015 | Kurt et al. | |
| 9,175,814 | B2 | 11/2015 | Shida et al. | |
| 9,188,292 | B2 | 11/2015 | Armer et al. | |
| 9,204,519 | B2 | 12/2015 | Gan et al. | |
| 9,206,964 | B2 | 12/2015 | Marsh et al. | |
| 9,207,484 | B2 | 12/2015 | Hendren et al. | |
| 9,210,733 | B2 | 12/2015 | Sargent et al. | |
| 9,234,655 | B2 | 1/2016 | Progl et al. | |
| 9,247,597 | B2 | 1/2016 | Miskin et al. | |
| 9,249,958 | B2 | 2/2016 | Schmuckle | |
| 9,285,103 | B2 | 3/2016 | Van De Ven et al. | |
| 9,285,109 | B1 * | 3/2016 | Olsson | F21V 23/06 |
| 9,306,139 | B2 | 4/2016 | Lee et al. | |
| 9,310,038 | B2 | 4/2016 | Athalye | |
| 9,310,059 | B2 * | 4/2016 | Zhang | F21S 10/06 |
| 9,420,644 | B1 | 8/2016 | Shum | |
| 9,429,285 | B2 | 8/2016 | Shum | |
| 9,500,325 | B2 | 11/2016 | Tong et al. | |
| 9,574,760 | B1 | 2/2017 | Olsson et al. | |
| 9,595,402 | B2 | 3/2017 | Vansickle et al. | |
| 9,598,575 | B2 | 3/2017 | Bhagwagar | |
| 9,614,322 | B1 | 4/2017 | Gibboney, Jr. | |
| 9,620,096 | B2 | 4/2017 | Ambrosino | |
| 9,657,930 | B2 | 5/2017 | Nolan et al. | |
| 9,719,658 | B2 | 8/2017 | Maglica et al. | |
| 9,730,282 | B2 | 8/2017 | Munday et al. | |
| 9,739,440 | B1 | 8/2017 | Deyaf et al. | |
| 9,746,170 | B1 | 8/2017 | Armer et al. | |
| 9,752,761 | B2 | 9/2017 | Lentine | |
| 9,777,915 | B2 | 10/2017 | Johnson | |
| 9,784,417 | B1 | 10/2017 | Springer | |
| 9,784,440 | B2 | 10/2017 | Erdener et al. | |
| 9,806,458 | B1 | 10/2017 | Chiu et al. | |
| 9,863,622 | B1 | 1/2018 | Armer et al. | |
| 9,915,419 | B2 * | 3/2018 | Potucek | F21V 31/005 |
| 9,964,286 | B1 | 5/2018 | Sooferian | |
| 9,995,463 | B2 | 6/2018 | Kjeldsen et al. | |
| 10,036,535 | B2 | 7/2018 | Catalano | |
| 10,041,635 | B2 | 8/2018 | Lam et al. | |
| 10,113,735 | B2 | 10/2018 | Emerson et al. | |
| 10,139,060 | B1 | 11/2018 | Erdener et al. | |
| 10,190,757 | B2 | 1/2019 | Erdener et al. | |
| 10,208,935 | B2 | 2/2019 | Erdener | |
| 10,240,758 | B2 | 3/2019 | Maglica | |
| 10,323,832 | B2 | 6/2019 | Erdener et al. | |
| 10,326,220 | B1 | 6/2019 | Most et al. | |
| 10,330,294 | B2 | 6/2019 | Erdener | |
| 10,357,146 | B2 | 7/2019 | Fiebel et al. | |
| 10,359,151 | B2 | 7/2019 | Tarsa et al. | |
| 10,465,864 | B2 | 11/2019 | Leichner | |
| 10,509,304 | B2 | 12/2019 | Chien | |
| 10,612,755 | B2 * | 4/2020 | Schmuckle | F21V 23/06 |
| 10,682,540 | B2 | 6/2020 | Mantione, III | |
| 10,704,745 | B2 | 7/2020 | Sherry et al. | |
| 10,760,773 | B2 | 9/2020 | Zhang | |
| 10,869,733 | B2 | 12/2020 | Learn | |
| 10,871,269 | B2 * | 12/2020 | Li | F21V 7/0075 |
| 10,941,924 | B2 | 3/2021 | Yu et al. | |
| 11,022,298 | B2 * | 6/2021 | Potucek | F21V 31/005 |
| 11,029,015 | B1 | 6/2021 | Olsson et al. | |
| 11,156,330 | B2 | 10/2021 | Grandadam | |
| 11,162,651 | B2 | 11/2021 | Zhang et al. | |
| 11,421,837 | B2 | 8/2022 | Zhang et al. | |
| 11,466,821 | B2 | 10/2022 | Zhang et al. | |
| 11,549,674 | B2 * | 1/2023 | Todaro | F21V 23/06 |
| 11,598,517 | B2 | 3/2023 | Zhang | |
| 2004/0163797 | A1 | 8/2004 | Cosley et al. | |
| 2005/0007777 | A1 | 1/2005 | Klipstein et al. | |
| 2005/0135101 | A1 | 6/2005 | Richmond | |
| 2005/0148241 | A1 | 7/2005 | Kohen | |
| 2005/0174782 | A1 | 8/2005 | Chapman | |
| 2006/0187653 | A1 | 8/2006 | Olsson | |
| 2006/0262542 | A1 | 11/2006 | Ibbitson et al. | |
| 2007/0019415 | A1 | 1/2007 | Leblanc et al. | |
| 2007/0076415 | A1 | 4/2007 | Chou et al. | |
| 2007/0139913 | A1 | 6/2007 | Savage | |
| 2008/0083360 | A1 | 4/2008 | Rowley | |
| 2008/0123340 | A1 | 5/2008 | McClellan | |
| 2008/0080187 | A1 | 11/2008 | Moss et al. | |
| 2008/0273331 | A1 | 11/2008 | Moss et al. | |
| 2009/0073696 | A1 | 3/2009 | Melzner | |
| 2009/0205935 | A1 | 8/2009 | Frick | |
| 2010/0091485 | A1 * | 4/2010 | Matthews | F21V 14/065 362/234 |
| 2010/0127626 | A1 | 5/2010 | Altonen et al. | |
| 2010/0176750 | A1 | 7/2010 | West | |
| 2010/0226139 | A1 | 9/2010 | Lynch et al. | |
| 2010/0259200 | A1 | 10/2010 | Beausoleil | |
| 2011/0019409 | A1 | 1/2011 | Wronski | |
| 2011/0075404 | A1 | 3/2011 | Allen et al. | |
| 2011/0080741 | A1 | 4/2011 | Noh | |
| 2011/0121752 | A1 | 5/2011 | Newman, Jr. et al. | |
| 2011/0204777 | A1 | 8/2011 | Lenk | |
| 2012/0081901 | A1 | 4/2012 | Tsang | |
| 2012/0091900 | A1 | 4/2012 | Fournier | |
| 2012/0091917 | A1 | 4/2012 | Vinther et al. | |
| 2012/0139426 | A1 | 6/2012 | Ilyes et al. | |
| 2012/0243213 | A1 | 9/2012 | Chen | |
| 2012/0243228 | A1 | 9/2012 | Olsson et al. | |
| 2013/0039055 | A1 | 2/2013 | Wilson et al. | |
| 2013/0088152 | A1 | 4/2013 | Hagen | |
| 2013/0114253 | A1 | 5/2013 | Segawa et al. | |
| 2013/0162139 | A1 | 6/2013 | Liu | |
| 2013/0208489 | A1 | 8/2013 | Schmuckle | |
| 2013/0221872 | A1 | 8/2013 | Gan et al. | |
| 2013/0249437 | A1 | 9/2013 | Wang et al. | |
| 2013/0331657 | A1 | 12/2013 | Basson et al. | |
| 2014/0022794 | A1 | 1/2014 | Laukkanen | |
| 2014/0092593 | A1 | 4/2014 | Gordin et al. | |
| 2014/0049967 | A1 | 5/2014 | Beausoleil | |
| 2014/0119022 | A1 | 5/2014 | Beausoleil | |
| 2014/0198482 | A1 | 7/2014 | Yue | |
| 2014/0218902 | A1 | 8/2014 | Maglica | |
| 2014/0256163 | A1 | 9/2014 | Kuo | |
| 2014/0300285 | A1 | 10/2014 | Medak | |
| 2014/0334157 | A1 | 11/2014 | Ferguson | |
| 2014/0375203 | A1 | 12/2014 | Goscha et al. | |
| 2015/0003050 | A1 | 1/2015 | Parsons | |
| 2015/0003072 | A1 | 1/2015 | Chen et al. | |
| 2015/0028776 | A1 | 1/2015 | McMillan | |
| 2015/0129398 | A1 | 5/2015 | Wilkins et al. | |
| 2015/0131282 | A1 | 5/2015 | Best et al. | |
| 2015/0131288 | A1 | 5/2015 | Zhang | |
| 2015/0153025 | A1 | 6/2015 | Wu | |
| 2015/0159842 | A1 * | 6/2015 | Zhang | F21V 31/00 362/231 |
| 2015/0167953 | A1 | 6/2015 | Huang | |
| 2015/0212263 | A1 | 7/2015 | Tzeng | |
| 2015/0159852 | A1 | 9/2015 | Brynjolfsson | |
| 2015/0247632 | A1 * | 9/2015 | McGilvray | F21V 31/005 362/267 |
| 2015/0260385 | A1 | 9/2015 | Brynjolfsson | |
| 2015/0345733 | A1 | 12/2015 | Bobbo et al. | |
| 2016/0123563 | A1 | 5/2016 | Ferguson et al. | |
| 2016/0153619 | A1 | 6/2016 | Frohnapfel | |
| 2016/0375163 | A1 | 12/2016 | Hawkins et al. | |
| 2016/0377280 | A1 | 12/2016 | Acampora et al. | |
| 2017/0072330 | A1 * | 3/2017 | Nelson | G09B 19/0069 |
| 2017/0085027 | A1 | 3/2017 | Ishaug et al. | |
| 2017/0108204 | A1 | 4/2017 | Wu | |
| 2017/0130907 | A1 | 5/2017 | Cho et al. | |
| 2017/0167695 | A1 | 6/2017 | Erdener | |
| 2017/0167718 | A1 | 6/2017 | Erdener et al. | |
| 2017/0171929 | A1 | 6/2017 | Erdener et al. | |
| 2017/0171932 | A1 | 6/2017 | Puvanakijjakorn | |
| 2017/0175963 | A1 | 6/2017 | Lentine et al. | |
| 2017/0219188 | A1 * | 8/2017 | Veloskey | F21V 29/70 |
| 2017/0325311 | A1 | 11/2017 | Athalye | |
| 2018/0017239 | A1 | 1/2018 | Liu et al. | |
| 2018/0031215 | A1 | 2/2018 | Erdener et al. | |
| 2018/0156423 | A1 | 6/2018 | Murby | |
| 2018/0156445 | A1 | 6/2018 | Chen | |

(56) References Cited

U.S. PATENT DOCUMENTS

| | | | |
|---|---|---|---|
| 2018/0306430 | A1 | 10/2018 | Weaver et al. |
| 2018/0352121 | A1 | 12/2018 | Chapman et al. |
| 2019/0264899 | A1 | 8/2019 | Erdener |
| 2020/0063951 | A1 | 2/2020 | Yu et al. |
| 2020/0072453 | A1 | 3/2020 | Mittal et al. |
| 2020/0173630 | A1 | 6/2020 | Zhang |
| 2021/0247038 | A1 | 8/2021 | Zhang |
| 2021/0356110 | A1 | 11/2021 | Zhang |
| 2021/0396362 | A1 | 12/2021 | Zhang et al. |
| 2022/0082223 | A1 | 3/2022 | Zhang et al. |
| 2023/0029871 | A1 | 2/2023 | Zhang |
| 2023/0160567 | A1 | 5/2023 | Zhang |
| 2023/0324037 | A1 | 10/2023 | Zhang |
| 2023/0417401 | A1 | 12/2023 | Zhang |

FOREIGN PATENT DOCUMENTS

| | | |
|---|---|---|
| CN | 200996560 | 12/2007 |
| CN | 201428965 | 3/2010 |
| CN | 101832493 | 9/2010 |
| CN | 201651985 | 11/2010 |
| CN | 201661934 | 12/2010 |
| CN | 201697032 | 1/2011 |
| CN | 201795292 | 4/2011 |
| CN | 201868044 | 6/2011 |
| CN | 202001978 | 10/2011 |
| CN | 202132720 | 2/2012 |
| CN | 102537788 | 7/2012 |
| CN | 202561568 | 11/2012 |
| CN | 102818171 | 12/2012 |
| CN | 202617421 | 12/2012 |
| CN | 202993068 | 6/2013 |
| CN | 203099444 | 7/2013 |
| CN | 203099944 | 7/2013 |
| CN | 203115737 | 8/2013 |
| CN | 203131451 | 8/2013 |
| CN | 203215414 | 9/2013 |
| CN | 103335219 | 10/2013 |
| CN | 203223756 | 10/2013 |
| CN | 203225915 | 10/2013 |
| CN | 203375353 | 1/2014 |
| CN | 203573985 | 4/2014 |
| CN | 303021758 | 12/2014 |
| CN | 104315460 | 1/2015 |
| CN | 104595757 | 5/2015 |
| CN | 204313074 | 5/2015 |
| CN | 105114878 | 12/2015 |
| CN | 204973611 | 1/2016 |
| CN | 105526521 | 4/2016 |
| CN | 105889771 | 8/2016 |
| CN | 205979248 | 2/2017 |
| CN | 206207184 | 5/2017 |
| CN | 206429994 | 8/2017 |
| CN | 206817297 | 12/2017 |
| CN | 207486634 | 6/2018 |
| CN | 109140397 | 1/2019 |
| CN | 109578834 | 4/2019 |
| CN | 110056825 | 7/2019 |
| CN | 110332485 | 10/2019 |
| CN | 209587772 | 11/2019 |
| CN | 209726016 | 12/2019 |
| CN | 209762834 | 12/2019 |
| CN | 210319700 | 4/2020 |
| DE | 19620209 | 11/1997 |
| DE | 10006410 | 8/2001 |
| DE | 202006006481 | 6/2006 |
| DE | 202014008377 | 10/2014 |
| EP | 1034690 | 10/2003 |
| EP | 0929993 | 10/2004 |
| GB | 2418979 | 4/2006 |
| GB | 2523802 | 9/2015 |
| HK | 1198615 | 4/2015 |
| JP | 3673943 | 7/2005 |
| JP | 3875392 | 1/2007 |
| JP | 4590283 | 12/2010 |
| JP | 2011165394 | 8/2011 |
| JP | 2012014980 | 1/2012 |
| JP | 4894688 | 3/2012 |
| JP | 5124978 | 1/2013 |
| JP | 5354209 | 11/2013 |
| JP | 2013254665 | 12/2013 |
| JP | 2014157795 | 8/2014 |
| JP | 2015076304 | 4/2015 |
| JP | 6182417 | 8/2017 |
| JP | 6473927 | 2/2019 |
| KR | 20120135003 | 12/2012 |
| KR | 101420351 | 7/2014 |
| KR | 20150009880 | 1/2015 |
| KR | 20150021814 | 3/2015 |
| KR | 101676019 | 11/2016 |
| KR | 101677730 | 11/2016 |
| KR | 101937643 | 1/2019 |
| KR | 101957884 | 3/2019 |
| RU | 2358354 | 6/2009 |
| TW | 330233 | 4/1998 |
| TW | M295720 | 8/2006 |
| TW | 201205901 | 2/2012 |
| TW | I391600 | 4/2013 |
| TW | M481324 | 7/2014 |
| WO | 2002084750 | 10/2002 |
| WO | 2008049405 | 5/2008 |
| WO | 2010021675 | 2/2010 |
| WO | 2011143510 | 11/2011 |
| WO | 2013021940 | 2/2013 |
| WO | 2013024557 | 2/2013 |
| WO | 2011065047 | 4/2013 |
| WO | 2013184166 | 12/2013 |
| WO | 2014108870 | 7/2014 |
| WO | 2015070150 | 5/2015 |
| WO | 2015162600 | 10/2015 |
| WO | 2019100448 | 5/2019 |
| WO | 2021134806 | 7/2021 |
| WO | 2021212541 | 10/2021 |

OTHER PUBLICATIONS

Article labeled: "Philips CP5 Concrete Pour Kit ("CP5")", Low Voltage Inground Lighting; On sale, described in a printed publication, and/or in public use at least as early as 2011, 1 pg.

HADCO; Installation Instructions: CP2, CP3, CP4 & CP5 Accessories, Copyright 2018, 2 pgs.

Keeping, Steven; Article entitled: "LED Packaging and Efficacy Advances Boost Lumen Density", located at <https://www.digikey.com/en/articles/led-packaging-and-efficacy-advances-boost-lumen-density>, published on Jan. 14, 2014, 5 pgs.

Keeping, Steven; Article entitled: "The Rise of Chip-on-Board LED Modules", located at <https://www.digikey.com/en/articles/the-rise-of-chip-on-board-led-modules>, published on Mar. 11, 2014, 5 pgs.

LEDS Magazine; Article entitled: "Controlling LED lighting systems: introducing the LED Driver", located at <https://www.ledsmagazine.com/architectural-lighting/retail-hospitality/article/16701402/controlling-led-lighting-systems-introducing-the-led-driver>, published Dec. 10, 2004, 11 pgs.

Linear Artwork, Inc.; Brochure or LA8303 Driver, published Jun. 11, 2009, 20 pgs.

NKK Switches; Design Guide for the '90s, Catalog No. 9405, Published Jan. 1994, 21 pgs.

NNO Innotech Co. Ltd; LA8303 Driver Specification, published Mar. 7, 2013, 20 pgs.

Philips Hadco; Brochure for FlexScape LED, Published 2015, 12 pgs.

Philips Landscape; Brochure for Luminaire Smart Service Guide, published Oct. 2014, 28 pgs.

Philips; Brochure for "BL9 Flexscape LED Accent Landscape Luminaire", Copyright 2014, 3 pgs.

Philips; Installation Instructions IL9 Inground, Copyright 2014, 2 pgs.

Philips; Installation Instructions: BL9 Accent, Copyright 2014, 4 pgs.

(56) References Cited

OTHER PUBLICATIONS

Pratt, Charles, Encyclopedia of Electronic Components vol. 1, Copyright 2013, 302 pgs.
Pratt, Charles, Encyclopedia of Electronic Components vol. 2, Copyright 2015, 316 pgs.
Spectrol Electronics Corporation; Spectrol Short Form Catalog, Copyright 1966, 13 pgs.
Zhang, Haicheng; Notice of Allowance for U.S. Appl. No. 16/645,458, filed Jan. 25, 2021, dated Jun. 16, 2021, 14 pgs.
Zhang, Haicheng; Notice of Allowance for U.S. Appl. No. 16/645,458, filed Jan. 25, 2021, dated Sep. 27, 2021, 42 pgs.
Zhang, Haicheng; Non-Final Office Action for U.S. Appl. No. 17/463,086, filed Aug. 31, 2021, dated Feb. 15, 2022, 61 pgs.
Zhang, Haicheng; Notice of Allowance for U.S. Appl. No. 17/463,086, filed Aug. 31, 2021, dated Jun. 2, 2022, 20 pgs.
Zhang, Haicheng; Final Office Action for U.S. Appl. No. 17/389,019, filed Jul. 29, 2021, dated Aug. 5, 2022, 23 pgs.
Zhang, Haicheng; Non-Final Office Action for U.S. Appl. No. 17/389,019, filed Jul. 29, 2021, dated Feb. 15, 2022, 65 pgs.
Zhang, Haicheng; Notice of Allowance for U.S. Appl. No. 17/389,019, filed Jul. 29, 2021, dated Oct. 24, 2022, 11 pgs.
Zhang, Haicheng; Non-Final Office Action for U.S. Appl. No. 16/696,968, filed Aug. 13, 2020, dated Jan. 19, 2022, 61 pgs.
Zhang, Haicheng; Notice of Allowance for U.S. Appl. No. 16/969,968, filed Aug. 13, 2020, dated Apr. 18, 2022, 17 pgs.
Zhang, Haicheng; Non-Final Office Action for U.S. Appl. No. 16/086,562, filed Sep. 19, 2018, dated Mar. 18, 2020, 12 pgs.
Zhang, Haicheng; Notice of Allowance for U.S. Appl. No. 16/086,562, filed Sep. 19, 2018, dated Jul. 8, 2020, 8 pgs.
Haicheng, Zhang; Office Action for Chinese patent application No. 201911420142.2, filed Dec. 31, 2019, dated May 20, 2020, 9 pgs.
Haicheng, Zhang; Search Report for Chinese patent application No. 201911420142.2, filed Dec. 31, 2019, dated May 12, 2020, 2 pgs.
Zhang, Haicheng; International Search Report and Written Opinion for PCT/CN2020/070502, filed Jan. 6, 2020, dated Aug. 27, 2020, 8 pgs.
Zhang, Haicheng; International Search Report and Written Opinion for PCT/CN2020/088127, filed Apr. 30, 2020, dated Jan. 4, 2021, 8 pgs.
Zhang, Haicheng; International Preliminary Report on Patentability for PCT/CN2017/115006, filed Dec. 7, 2017, dated May 26, 2020, 9 pgs.
Zhang, Haicheng; International Search Report and Written Opinion for PCT/CN2017/115006, filed Dec. 7, 2017, dated Aug. 17, 2018, 14 pgs.
Zhang, Haicheng; International Preliminary Report on Patentability for PCT/CN2020/070502, filed Jan. 6, 2020, ated Jul. 14, 2022, 11 pgs.
Zhang, Haicheng; Requirement for Restriction/Election for U.S. Appl. No. 17/389,017, filed Jul. 29, 2021, dated Sep. 19, 2023, 8 pgs.
Jiangsu Sur Lighting Co., Ltd.; Office Action for Chinese patent application No. 2017111950586, filed Nov. 24, 2017, dated Aug. 29, 2023, 9 pgs.
Zhang, Haicheng; Non-Final Office Action for U.S. Appl. No. 18/100,300, filed Jan. 23, 2023, dated Jun. 21, 2023, 64 pgs.
Zhang, Haicheng; Non-Final Office Action for U.S. Appl. No. 17/389,017, filed Jul. 29, 2021, mailed Dec. 19, 2023, 85 pgs.
Zhang, Haicheng; Final Office Action for U.S. Appl. No. 18/100,300, filed Jan. 23, 2023, mailed Dec. 7, 2023, 28 pgs.

* cited by examiner

LAMP MODULE GROUP

CROSS REFERENCE TO THE RELATED APPLICATIONS

This application is a continuation of U.S. application Ser. No. 17/463,086, which is a continuation of U.S. application Ser. No. 16/645,458, filed Jan. 25, 2021, which issued into U.S. Pat. No. 11,162,651 on Nov. 2, 2021, which is the national phase entry of International Application No. PCT/CN2020/070502, filed on Jan. 6, 2020, which is based upon and claims priority to Chinese Patent Application No. 201911420142.2, filed on Dec. 31, 2019, each of which is hereby specifically incorporated by reference herein in its entirety.

TECHNICAL FIELD

The present disclosure relates to the technical field of integrated lamp module groups, and more specifically to a lamp module group.

BACKGROUND

At present, LED lamps are designed with module group structure. One reason is to facilitate maintenance and another reason is to save costs. The so-called module group is formed by integrating a light source and a power supply, which is assembled in a lamp housing to form a lamp. Once the lamp fails to work, the module group is damaged in most of the cases. Then, only the damaged module group needs to be replaced, which saves the cost of the lamp housing. However, in this way, when a module group without a waterproof function is installed in the lamp housing, it should be ensured that the lamp housing can waterproof, so that the LED lamp can meet the requirements of outdoor work.

SUMMARY

The present invention provides a lamp module group for realizing the waterproof performance of the lamp module and the purpose of directly replacing the module group without replacing the housing after the lamp module group fails to work.

The present invention provides a lamp module group, including: an LED lamp board, a power supply driving module, a concentric male terminal and a first housing, wherein the first housing has a cylindrical structure, a convex ring having a ring structure is provided on an inner wall of the first housing close to an upper open end, and an upper surface of the convex ring is installed on the LED lamp board by a screw; the power supply driving module is provided below the LED lamp board with an interval, an output end of the power supply driving module is connected to a power supply input end of the LED lamp board through a wire, an input end of the power supply driving module is connected to an output end of the concentric male terminal through a wire, a lower surface of the first housing is provided with a first protruding column having a ring structure, and the first protruding column and the first housing are provided to be in communication with each other; one end of the concentric male terminal close to the power supply driving module is fixed in the first protruding column; the other end of the concentric male terminal extends out of an inner cavity of the first protruding column and is connected to a concentric female terminal; an end of the concentric female terminal away from the concentric male terminal is installed in a second housing; and a waterproof rubber ring is provided between the first housing and the second housing.

In one exemplary aspect, a lighting assembly can comprise a lamp module group comprising a first housing defining a protruding column, the first housing defining a cavity, the first housing defining a housing opening to the cavity positioned opposite from the protruding column; a power supply driving module positioned within the cavity; and a first concentric terminal connected in electrical communication with the power supply driving module, the first concentric terminal extending through the protruding column; and a second housing comprising a second concentric terminal, the second housing receiving a portion of the first housing, the second concentric terminal connected in electrical communication with the first concentric terminal, the second concentric terminal configured to supply power to the power supply driving module through the first concentric terminal.

In another exemplary aspect, a method for assembling a lighting assembly can comprise attaching a mask to a first housing of a lamp module group to redirect light emitted from an LED lamp board of the lamp module group, the LED lamp board positioned within a cavity defined by the first housing, the LED lamp board configured to emit light through a housing opening defined at a first housing end of the first housing; and attaching a second housing to a protruding column of the first housing to supply power to a first concentric terminal of the lamp module group from a second concentric terminal of the second housing, the first concentric terminal extending through the protruding column.

Preferably, sides of the LED lamp board and the screw close to the upper open end of the first housing are provided with a second sealing layer, a reflecting cup is sleeved above the second sealing layer, a lens is sleeved at a center of the reflecting cup, and the lens is configured to be fastened on a light emitting part of the LDE lamp board.

Preferably, a first sealing layer is provided between the LED lamp board and the power supply driving module, and the first sealing layer is configured for sealing and fixing the LED lamp board, the power supply driving module, and the wires together in the first housing.

Preferably, an insulating sheet having a ring structure is provided on an inner wall of an end of the first housing close to the first protruding column, a lower surface of the insulating sheet and an inner bottom of the first housing are attached to each other, and an upper surface of the insulating sheet is fixed inside the first housing via the first sealing layer.

Preferably, the concentric female terminal includes: a first insulating casing, a conductive metal ring, a conductive spring sheet, and a first plastic insulating boss, wherein the concentric female terminal has a columnar structure, a circular notch is provided above the first insulating casing, a bottom of the circular notch is provided with the first plastic insulating boss, a center of the first plastic insulating boss is embedded with a conductive metal core, an inner wall of the circular notch is provided with the conductive metal ring, the conductive spring sheet protruding toward an axial centerline direction of the conductive metal ring is provided on an annular inner wall of the conductive metal ring, an outer wall of the conductive metal ring is connected to a wire, and a lower portion of the conductive metal core extends downward from a center of the first plastic insulating boss and is connected to the wire; the conductive metal ring is configured to insert the concentric male terminal; a first limiting boss protruding outward is provided on a circumferential outer wall of an end of the first insulating casing close to the circular notch, and the first limiting boss and the circular notch end face the concentric male terminal, and are configured to cooperate with the concentric male terminal.

Preferably, the concentric male terminal includes: a second insulating casing, a second plastic insulating boss, an outer conductive metal pipe, and a first inner conductive metal pipe, wherein the second insulating casing has a columnar structure, a lower surface of the columnar structure is provided with a circular notch, a second plastic insulating boss is provided in the circular notch, a side of the second insulating boss close to the circular notch is provided with a third plastic insulating column, and a diameter of the third insulating column is smaller than a diameter of the second plastic insulating boss; an outer conductive metal pipe is provided between the third insulating column and the second insulating casing, the first plastic insulating boss and the second plastic insulating boss are embedded with a second inner conductive metal pipe, one end of the second inner conductive metal pipe close to a bottom of the groove is provided with a wire, and the wire at one end away from the second inner conductive metal pipe penetrates and extends out of the second insulating casing, a wire is also connected to an outer wall of the outer conductive metal pipe, and the wire at one end away from the outer conductive metal pipe penetrates and extends out of the second insulating casing; and the second inner conductive metal pipe is further embedded with a first inner conductive metal pipe, a lower end of the first inner conductive metal pipe is provided with an opening having a circular structure, and the opening is configured for installing the concentric female terminal; a circumferential outer wall of an end of the second insulating casing close to the opening of a circular groove is provided with a second limiting boss, the second limiting boss and the second insulating casing are each configured to be inserted into and fixed in the first protruding column, an end of the first protruding column away from the first housing is further provided with a first limiting groove, and a diameter of a notch of the first limiting groove is larger than a diameter of a central through hole of the first protruding column; and the first limiting groove is configured for embedding the second limiting boss.

Preferably, a circumferential outer wall of the first protruding column is provided with an external thread, the external thread is configured for installing the second housing, the second housing has a tubular structure, an installing table having a tapered structure is provided below the tubular structure, an end of the installing table away from the second housing is provided with a through hole, the through hole is configured for installing the first limiting boss of the concentric female terminal, a lower surface of the first limiting boss is connected to an inner bottom surface of the installing table, and an upper surface of the first limiting boss is provided with a waterproof rubber ring.

Preferably, a circumferential outer wall of an end of the first housing away from the first protruding column is provided with an external thread, the external thread is configured for installing a mask, a center of the mask is provided with a through installing hole, an inner bottom of one end of the installing hole away from the first housing is embedded with a stepped glass, a side of the stepped glass away from an inner ground of the installing hole is provided with a silicone gasket having a ring structure, and the silicone gasket is sleeved on a circumferential outer wall of an end of the external thread of the first housing.

Preferably, the mask is any one selected from the group consisting of a flat lid, a curved lid, a round beveled cover, a vertical lamp cover, a long tube cover, and a square beveled cover.

Preferably, an end of the second housing away from the first housing is fixed on a lamp holder, the lamp holder is fixed on a base by a fixing rod, an inner wall of the lamp holder is spirally embedded with a cooling pipeline, and both ends of the cooling pipe extend from an end of the lamp holder close to the fixing rod onto the base; a water storage cavity is provided in the base, an upper surface of the water storage cavity is provided with a water inlet and a water outlet, the water inlet is connected to a water inlet pipe, the water outlet is connected to a water outlet pipe, and the water inlet pipe and the water outlet pipe are connected to two open ends of the cooling pipeline, respectively; one end of the lamp holder close to the second housing is provided with a ventilation plate, one end of the ventilation plate away from the second housing is provided with a fan and a water pressure adjusting device, the fan is provided to be close to the ventilation plate, one end of the water pressure adjusting device is connected to a driving device, and the other end is connected to an end of the cooling pipeline close to the water outlet pipe; and a circumferential outer wall of the water storage cavity is further provided on a water injecting port.

The advantages of the present invention are as follows.

The lamp module group provided by the present invention can achieve the purposes of heat conduction and heat dissipation, waterproofing, and rotational coaxial connection power extraction by the provided first housing, second housing, concentric male terminal, and concentric female terminal, and can realize the waterproofing between the first housing and the second housing by the first housing causing a second housing where the concentric male terminal and the concentric female terminal is located to squeeze a waterproof rubber ring.

The first housing and the second housing are connected into one body by a thread, which may conduct the heat of the power supply driving module and the LED lamp board. Specifically, the heat of the power supply driving module and the LED lamp board is conducted to the second housing where the concentric female terminal is located through the connection between the first housing and the second housing, thereby achieving the purpose of dissipating the heat of the power supply driving module and the LED lamp board.

By the provided concentric female terminal and concentric male terminal, the coaxial rotational connection and power extraction during thread installation of the first housing and the second housing are achieved.

The lamp module group has a structure that can realize heat conduction, waterproofing, and rotational coaxial connection power extraction. Meanwhile, the external thread provided on the first housing, the external thread provided on the first protruding column, and the concentric male terminal in conjunction with the concentric female terminal can be combined with other accessories or extension accessories to form a variety of lamps, thereby improving the use range of the lamp module group.

During specific work, the concentric male terminal and the concentric female terminal are each provided with a waterproof structure. The power supply driving module is filled with glue between the concentric male terminal and the LED lamp board, thereby forming a first sealing layer in the first housing so that the power supply driving module is completely sealed in the first sealing layer. A side of the LED lamp board away from the power supply driving module is also fixed in the first housing by a screw. An upper surface of the screw is provided with a second sealing layer. The second sealing layer is configured to seal a gap between the screw and the LED lamp board. Thus, the LED lamp board and the concentric male terminal are enabled to achieve the purpose of complete waterproofing in the first housing. The power supply driving module, the power terminal of the LED lamp board, and the concentric male terminal are each enabled to achieve the purpose of waterproofing and modularization. When it is required to use, the concentric male terminal and the concentric female terminal are plugged into each other to achieve conduction. An end of the concentric female terminal away from the concentric male terminal is configured to extract power, so that the electrical conduction of the concentric male terminal can be achieved. The power supply driving module is further started. After the power supply driving module is started, the LED lamp board is lit, thereby achieving the work of the lamp module group.

When the lamp module fails to work, the lamp module group installed in the lamp cover can be directly detached and replaced, thereby reducing the waste caused by the direct replacement of the entire lamp cover. Meanwhile, the lamp module group achieves the purpose of sealing and waterproofing by the first sealing layer, the second sealing layer, and the concentric male terminal and concentric female terminal with sealing and waterproofing capability, which greatly improves the purpose of easy replacement of the lamp module group after failure. Meanwhile, after the LED lamp fails, the lamp module group can be directly replaced rather than the lamp housing and the lamp module group together.

The first housing and the second housing configured for installing the concentric female terminal are each made of a metal material. The first housing tightly contacts each of the concentric male terminal, the power supply driving module and the LED lamp board through the first sealing layer, and thus the thermal energy generated by the power supply driving module and the LED lamp board can be conducted through the first housing and the second housing. Therefore, the heat dissipation efficiency of the power supply driving module and the LED lamp board is improved, the failure of the power supply driving module, and the LED lamp board due to overheating is reduced, and the service life of the power supply driving module and the LED lamp board is improved. Meanwhile, the aging of the concentric male terminal, the concentric female terminal, and the wire is reduced, effectively extending the service life of the lamp module group.

Other features and advantages of the present invention are set forth in the following description, and partly become obvious from the description, or be understood by implementing the present invention. The objectives and other advantages of the present invention can be achieved and obtained by the structure particularly pointed out in the written description and the accompanying drawings.

The technical solutions of the present invention are described in further detail below with reference to the accompanying drawings and embodiments.

BRIEF DESCRIPTION OF THE DRAWINGS

The accompanying drawings are used to provide a further understanding of the present invention and constitute a part of the description, are used to explain the present invention together with the embodiments of the present invention, and do not limit the present invention. In the accompanying drawings.

Figure 1:
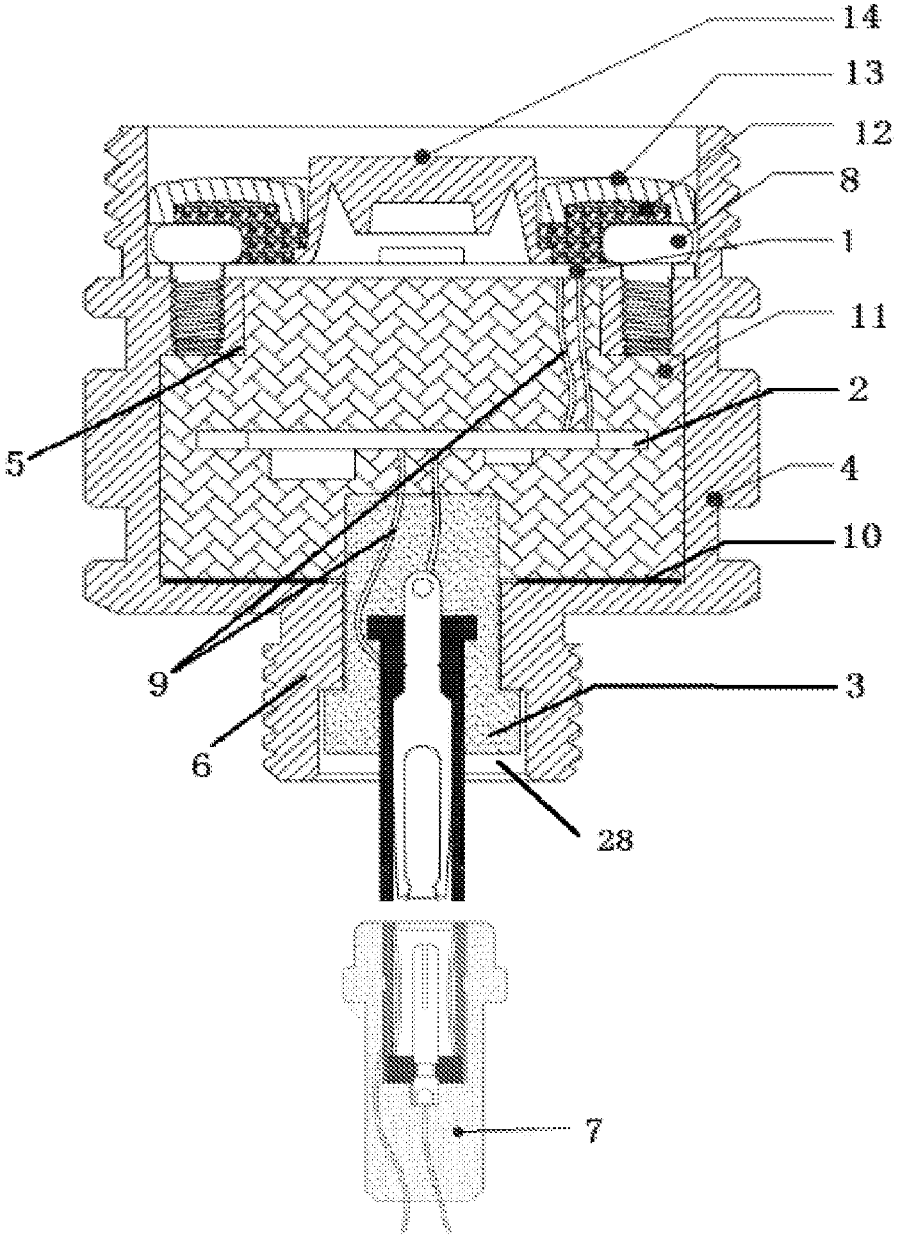
FIG. 1 is a schematic structural diagram of the present invention.

Among them, 1—LED lamp board, 2—power supply driving module, 3—concentric male terminal, 4—first housing, 5—convex ring, 6—first protruding column, 7—concentric female terminal, 8—screw, 9—wire, 10—insulating sheet, 11—first sealing layer, 12—second sealing layer, 13—reflecting cup, 14—lens, 15—first insulating casing, 16—conductive metal ring, 17—conductive spring sheet, 18—first plastic insulating boss, 19—second plastic insulating boss, 20—conductive metal core, 21—second insulating casing, 22—outer conductive metal pipe, 23—first inner conductive metal pipe, 24—first limiting boss, 25—second inner conductive metal pipe, 26—third plastic insulating column, 27—second limiting boss, 28—first limiting groove, 29—second housing, 30—waterproof rubber ring, 31—installing table, 32—silicone gasket, 33—stepped glass, 34—mask, 35—lamp holder, 36—base, 37—fixing rod, 38—cooling pipeline, 39—ventilation plate, 40—first gear, 41—second gear, 42—first rotating shaft, 43—fourth protruding column, 44—fixed disc, 45—first connecting rod, 46—third shaft sleeve, 47—blade, 48—third rotating shaft, 49—motor, 50—fourth rotating shaft, 51—bearing, 52—slideway, 53—sliding rod, 54—first connecting plate, 55—second connecting plate, 56—fourth shaft sleeve, 57—fourth connecting plate, 58—first shaft sleeve, 59—fifth rotating shaft, 60—fifth connecting plate, 61—second connecting rod, 63—third connecting rod, 64—third protruding column, 65—second shaft sleeve, 66—water storage cavity, 67—water outlet, 68—water inlet, 69—water outlet pipe, 70—water inlet pipe, 71—water injecting port, 72—piston pipe, 73—plunger rod, 74—movable plug, 75—first check valve, and 76—second check valve.

DETAILED DESCRIPTION OF THE EMBODIMENTS

Preferred embodiments of the present invention are described below with reference to the accompanying drawings. It should be understood that the preferred embodiments described herein are only used to illustrate and explain the present invention, and are not intended to limit the present invention.

As shown in FIGS. 1-6, an embodiment of the present invention provides a lamp module group, including: the LED lamp board 1, the power supply driving module 2, the concentric male terminal 3, and the first housing 4. The first housing 4 has a cylindrical structure, the convex ring 5 having a ring structure is provided on an inner wall of the first housing 4 close to an upper open end. An upper surface of the convex ring 5 is installed on the LED lamp board 1 by the screw 8. The power supply driving module 2 is provided below the LED lamp board 1 with an interval. An output end of the power supply driving module 2 is connected to a power supply input end of the LED lamp board 1 through the wire 9. An input end of the power supply driving module 2 is connected to an output end of the concentric male terminal 3 through the wire 9. A lower surface of the first housing 4 is provided with the first protruding column 6 with a ring structure. The first protruding column 6 and the first housing 4 are provided to be in communication with each other. One end of the concentric male terminal 3 close to the power supply driving module 2 is fixed in the first housing 4, and the other end of the concentric male terminal 3 extends out of an inner cavity of the first protruding column 6 and is connected to the concentric female terminal 7. An end of the concentric female terminal 7 away from the concentric male terminal 3 is installed in the second housing 29. The waterproof rubber ring 30 is provided between the first housing 4 and the second housing 29.

The lamp module group provided in the present invention can achieve the purposes of heat conduction and heat dissipation, waterproofing, and rotational coaxial connection power extraction by the provided first housing 4, second housing 29, concentric male terminal 3 and concentric female terminal 7, and can realize the waterproofing between the first housing 4 and the second housing 29 by the first housing 4 causing a second housing 29 where the concentric male terminal 3 and the concentric female terminal 7 are located to squeeze the waterproofing rubber ring 30.

The first housing 4 and the second housing 19 are connected into one body by a thread, which may conduct the heat of the power supply driving module 2 and the LED lamp board 1. Specifically, the heat of the power supply driving module 2 and the LED lamp board 1 is conducted to the second housing 29 where the concentric female terminal 7 is located through the connection between the first housing 4 and the second housing 29, thereby achieving the purpose of dissipating the heat of the power supply driving module 2 and the LED lamp board 1;

By the provided concentric female terminal 7 and concentric male terminal 3, the coaxial rotational connection and power extraction during thread installation of the first housing 4 and the second housing 29 are achieved.

The lamp module group has a structure that can realize heat conduction, waterproofing, and rotational coaxial connection power extraction. Meanwhile, the external thread provided on the first housing 4, the external thread provided on the first protruding column 6, and the concentric male terminal 3 in conjunction with the concentric female terminal 7 can be combined with other accessories or extension accessories to form a variety of lamps, thereby improving the use range of the lamp module group.

During specific work, the concentric male terminal 3 and the concentric female terminal 7 are each provided with a waterproof structure. The power supply driving module 2 is filled with glue between the concentric male terminal 3 and the LED lamp board 1, thereby forming the first sealing layer 11 in the first housing 4 so that the power supply driving module 2 is completely sealed in the first sealing layer 11. A side of the LED lamp board 1 away from the power supply driving module 2 is also fixed in the first housing by the screw 8. An upper surface of the screw 8 is provided with the second sealing layer 12. The second sealing layer 12 is configured to seal a gap between the screw 8 and the LED lamp board 1. Thus, the LED lamp board 1 and the concentric male terminal 3 are enabled to achieve the purpose of complete waterproofing in the first housing 4. The power supply driving module 2, the power terminal of the LED lamp board 1, and the concentric male terminal 3 are each enabled to achieve the purpose of waterproofing and modularization. When it is required to use, the concentric male terminal 3 and the concentric female terminal 7 are plugged into each other to achieve conduction. An end of the concentric female terminal 7 away from the concentric male terminal 3 is configured to extract power, so that the electrical conduction of the concentric male terminal 3 can be achieved. The power supply driving module 2 is further started. After the power supply driving module 2 is started, the LED lamp board 1 is lit, thereby achieving the work of the lamp module group.

When the lamp module fails to work, the lamp module group installed in the lamp cover can be directly detached and replaced, thereby reducing the waste caused by the direct replacement of the entire lamp cover. Meanwhile, the lamp module group achieves the purpose of sealing and waterproofing by the first sealing layer 11, the second sealing layer 12, and the concentric male terminal 3 and concentric female terminal 7 with sealing and waterproofing capability, which greatly improves the purpose of easy replacement of the lamp module group after failure. Meanwhile, after the LED lamp fails, the lamp module group can be directly replaced rather than the lamp housing and the lamp module group together.

The lamp module group is formed by the concentric male terminal 3, the LED lamp board 1, the power supply driving module 2 and the first housing 4 together, and achieves the purpose of electrically connecting to the power supply by combining the concentric female terminal 7. The lamp module group may also be formed by the concentric male terminal 3, the LED lamp board 1, the power supply driving module 2, and the concentric female terminal 7 together. The combination manners of the above two lamp module groups each extract power through one end of the concentric female terminal. Then, the concentric male terminal is connected to the concentric female terminal and conducts the electricity to the power supply driving module 2, thereby achieving the purpose of the power supply communicating with the power supply driving module 2 and starting the work of the LED lamp board 1.

The first housing 4 and the second housing 29 configured for installing the concentric female terminal 7 are each made of a metal material. The first housing 4 tightly contacts each of the concentric male terminal 3, the power supply driving module 2 and the LED lamp board 1 through the first sealing layer 11, and thus the thermal energy generated by the power supply driving module 2 and the LED lamp board 1 can be conducted through the first housing 4 and the second housing 29. Therefore, the heat dissipation efficiency of the power supply driving module 2 and the LED lamp board 1 is improved, the failure of the power supply driving module 2 and the LED lamp board 1 due to overheating is reduced, and the service life of the power supply driving module 2 and the LED lamp board 1 is improved. Meanwhile, the aging of the concentric male terminal 3, the concentric female terminal 7 and the wire 9 is reduced, effectively extending the service life of the lamp module group.

Figure 2:
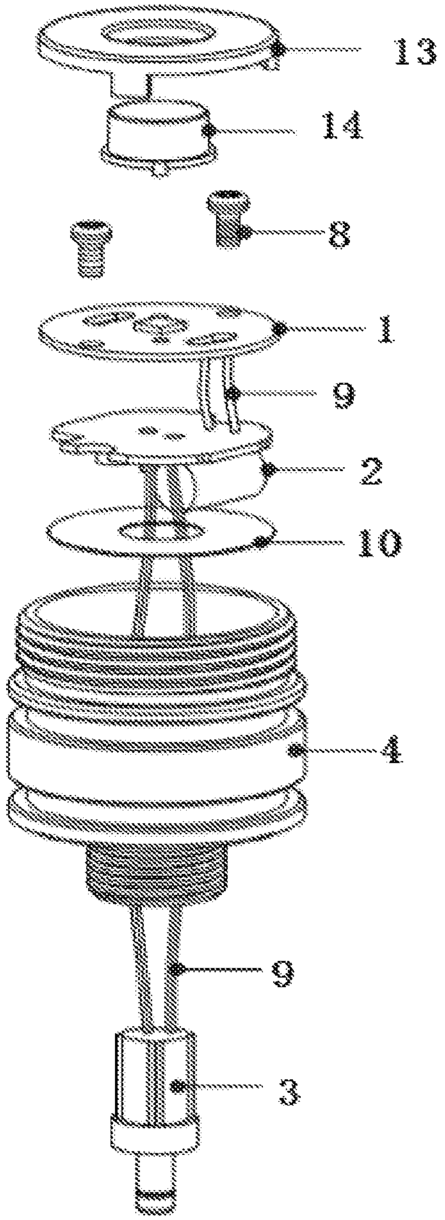
FIG. 2 is a schematic diagram of an explosion structure of the present invention.

As shown in FIGS. 1-2, sides of the LED lamp board 1 and the screw 8 close to the upper open end of the first housing 4 are provided with the second sealing layer 2. The reflecting cup 13 is sleeved above the second sealing layer 2. The lens 14 is sleeved at a center of the reflecting cup 1. The lens 14 is configured to be fastened on a light emitting part of the LDE lamp board.

The second sealing layer 12 can make it difficult for water or mist to enter the LED lamp board 1 from a hole of the screw 8 during the use of the LED lamp board 1. The reflecting cup 13 can reflect light on the LED lamp board 1 to makes the light brighter, and meanwhile, can cover an upper surface of the LED lamp board 1 to further achieve the purpose of waterproofing. The lens 14 can not only condense the LED light, but also can achieve the purpose of further waterproofing of the LED lamp board 1.

As shown in FIGS. 1-2, the first sealing layer 11 is provided between the LED lamp board 1 and the power supply driving module 2. The first sealing layer 11 is configured for sealing and fixing the LED lamp board 1, the power supply driving module 2, and the wires 9 together in the first housing 4.

The first sealing layer 11 can enable the LED lamp board 1 and the power supply driving module 2 to achieve the purpose of waterproof sealing in the first housing 4, so that the LED lamp board 1 and the power supply driving module 2 can form one integral member via the first sealing layer 11.

As shown in FIGS. 1-2, the insulating sheet 10 having a ring structure is provided on an inner wall of an end of the first housing 4 close to the first protruding column 6. A lower surface of the insulating sheet 10 and an inner bottom of the first housing 4 are attached to each other. An upper surface of the insulating sheet 10 is fixed inside the first housing 4 via the first sealing layer 11.

The insulating sheet 10 can achieve the purpose of insulation and separation between the first sealing layer 11 and the first housing 4, and meanwhile, can also enable the first sealing layer 11 to achieve the purpose of performing isolation and padding between the first housing 4 and the concentric male terminal 3 during the filling of the first sealing layer 11 in the first housing 4.

Figure 3:
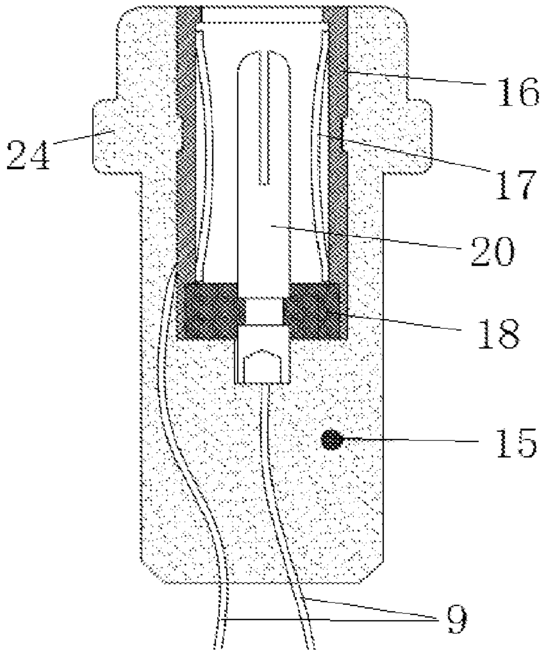
FIG. 3 is a schematic structural diagram of a concentric female terminal of the present invention.

As shown in FIG. 3, the concentric female terminal 7 includes the first insulating casing 15, the conductive metal ring 16, the conductive spring sheet 17, and the first plastic insulating boss 18. The concentric female terminal 7 has a columnar structure. A circular notch is provided above the first insulating casing 15. A bottom of the circular notch is provided with the first plastic insulating boss 18. A center of the first plastic insulating boss 18 is embedded with the conductive metal core 20. An inner wall of the circular notch is provided with the conductive metal ring 16. The conductive spring sheet 17 protruding toward an axial centerline direction of the conductive metal ring 16 is provided on an annular inner wall of the conductive metal ring 16. An outer wall of the conductive metal ring 16 is connected to the wire 9. A lower portion of the conductive metal core 20 extends downward from a center of the first plastic insulating boss 18 and is connected to the wire 9. The conductive metal ring 16 is configured to insert the concentric male terminal 3. A first limiting boss 24 protruding outward is provided on a circumferential outer wall of an end of the first insulating casing 15 close to the circular notch. The first limiting boss 24 and the circular notch end face the concentric male terminal 3, and are configured to cooperate with the concentric male terminal 3.

The concentric female terminal 7 is configured for plugging into the concentric male terminal 3 and realizing electrical connection, so that the concentric female terminal 7 extracts power from a power supply at an end away from the concentric male terminal 3, conducts the electricity to the power supply driving module 2, and then lights the LED lamp board 1 via the power supply driving module 2.

The conductive spring sheet 17 and the conductive metal core 20 of the concentric female terminal 7 are configured for inserting the concentric male terminal 3. The conductive spring sheet 17 can press the concentric male terminal 3 into a power extraction end of the concentric female terminal 7, so that the concentric male terminal 3 can be fully attached to the conductive metal core 20. Thus, the concentric male terminal 3 and the concentric female terminal 7 can be in good contact, and the situation of power-off or virtual connection of the power supply in power extraction due to poor contact is reduced.

Figure 4:
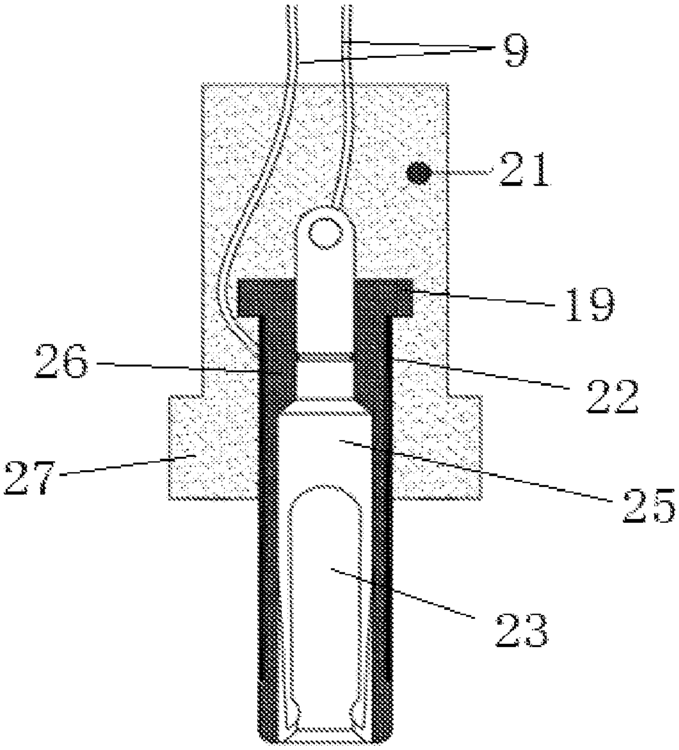
FIG. 4 is a schematic structural diagram of a concentric male terminal of the present invention.

As shown in FIG. 4, the concentric male terminal 3 includes the second insulating casing 21, the second plastic insulating boss 19, the outer conductive metal pipe 22 and the first inner conductive metal pipe 23. The second insulating casing 21 has a columnar structure. A lower surface of the columnar structure is provided with a circular notch. A second plastic insulating boss 19 is provided in the circular notch. A side of the second insulating boss close to the circular notch is provided with the third plastic insulating column 26. A diameter of the third insulating column is smaller than a diameter of the second plastic insulating boss 19. The outer conductive metal pipe 22 is provided between the third insulating post and the second insulating casing 21. The first plastic insulating boss 18 and the second plastic insulating boss 19 are embedded with the second inner conductive metal pipe 25. One end of the second inner conductive metal pipe 25 close to a bottom of the notch is provided with the wire 9. The wire 9 at one end away from the second inner conductive metal pipe 25 penetrates and extends out of the second insulating casing 21. Another wire 9 is further connected to an outer wall of the outer conductive metal pipe 22. The wire 9 at one end away from the outer conductive metal pipe 22 penetrates and extends out of the second insulating casing 21. The second inner conductive metal pipe 25 is further embedded with the first inner conductive metal pipe 23. The lower end of the first inner conductive metal pipe 23 is provided with an opening having a circular structure. The opening is configured for installing the concentric female terminal 7. A circumferential outer wall of an end of the second insulating casing 21 close to the opening of a circular groove is provided with the second limiting boss 27. The second limiting boss 27 and the second insulating casing 21 are each configured to be inserted into and fixed in the first protruding post 6. An end of the first protruding post 6 away from the first housing 4 is further provided with the first limiting groove 28. A diameter of a notch of the first limiting groove 28 is larger than a diameter of a central through hole of the first protruding post 6. The first limiting groove 28 is configured for embedding the second limiting boss 27.

Further, both the concentric male terminal 3 and the concentric female terminal 7 can achieve 360-degree rotation after being plugged, and can further ensure that the power-on state is still maintained during the rotation. Moreover, the twisted disconnection of the wire 9 is avoided during the rotation.

During use, one end of the first inner conductive metal pipe 23 of the concentric male terminal 3 is inserted into the conductive metal core 20 of the concentric female terminal 7. The other end of the concentric male terminal 3 is a wire 9 end. The wire 9 at the wire 9 end is electrically connected to the power supply driving module 2. Meanwhile, the second insulating casing 21 provided at the wire 9 end of the concentric male terminal 3 is inserted into an inner cavity of the first housing 4 and is collectively sealed and fixed in the first housing via the first sealing layer 11. One end of the second limiting boss 27 of the concentric male terminal 3 close to the second insulating casing 21 is closely attached to a groove bottom of a first limiting groove. The second limiting boss 27 is completely placed in the first limiting groove. Thus, the second insulating casing 21 and the second limiting boss 27 of the concentric male terminal 3 are completely located in the first protruding column 6 and the inner cavity of the first housing.

Figure 5:
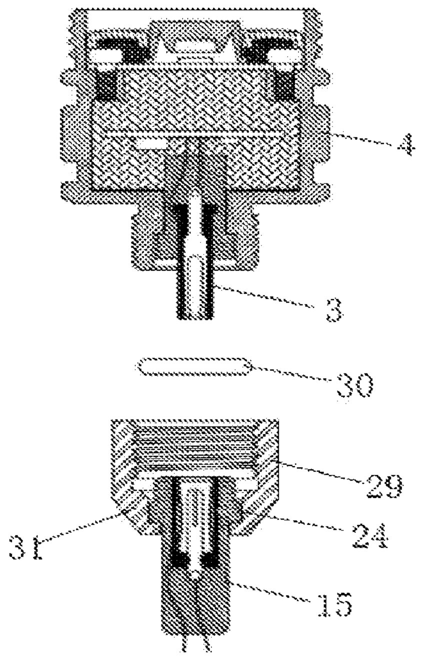
FIG. 5 is a schematic structural diagram of a connection between a first housing and a second housing of the present invention.

As shown in FIGS. 3-5, the conductive metal ring 16 and the conductive spring sheet 17 of the concentric female terminal 7 are provided to be communicated with each other through the wire 9, and form a third communication line in the concentric female terminal 7. The conductive metal core 20 forms a fourth communication line in the notch of the first insulating casing 15 via the first plastic insulation boss 18. The first inner conductive metal pipe 23 and the second inner conductive metal pipe 25 of the concentric male terminal 3 are each made of a metal material. The first conductive metal pipe is a circular notch provided on the second conductive metal pipe, thereby forming a first communication line. The outer conductive metal pipe 22 is separated by the third plastic insulating column 26 from the circumferential outer wall of the second conductive metal pipe. The outer conductive metal pipe 22 penetrates the second insulator housing through the wire 9 and forms a second communication line. An end of the concentric male terminal 3 away from the concentric female terminal 7 is configured to connect the power supply driving module 2. An end of the concentric female terminal 7 away from the concentric male terminal 3 is configured to connect a power supply. The first communication line and the third communication line are provided to be turned on; the second communication line and the fourth communication line are provided to be turned on. When the concentric male terminal 3 and the concentric female terminal 7 are communicated with each other, the first communication line and the second communication line are not turned on. The third communication line and the fourth communication line are not turned on.

As shown in FIG. 5, a circumferential outer wall of the first protruding post 6 is provided with an external thread. The external thread is configured for installing the second housing 29. The second housing 29 has a tubular structure. The installing table 31 with a tapered structure is provided below the tubular structure. An end of the installing table 31 away from the second housing 29 is provided with a through hole. The through hole is configured for installing the first limiting boss 24 of the concentric female terminal 7. A lower surface of the first limiting boss 24 is connected to an inner bottom surface of the installing table 31. An upper surface of the first limiting boss is provided with the waterproofing rubber ring 30.

The second housing 29 is configured for fixing the concentric female terminal 7 and enables the concentric female terminal 7 to be protected by the second housing 29, which is also beneficial for the concentric female terminal 7 and the concentric male terminal 3 to be better installed as one body.

During use, an internal thread provided on an inner wall of one end of the second housing 29 away from the installing table 31 is installed to the external thread of the first protruding column 6 provided on the first housing 4. The waterproof rubber ring 30 with a ring structure is further provided between the second housing 29 and the first protruding column 6. The waterproof rubber ring 30 enables a gap between the first housing 4 and the second housing 29 to achieve the purpose of sealing and waterproofing. Meanwhile, the waterproof rubber ring 30 can achieve the purpose of pressing the waterproof rubber ring 30 between the first housing 4 and the second housing 29 via the first protruding column 6, which not only enhances the contact between the concentric male terminal 3 and the concentric female terminal 7, but also achieves the purpose of sealing and waterproofing.

Figure 6:
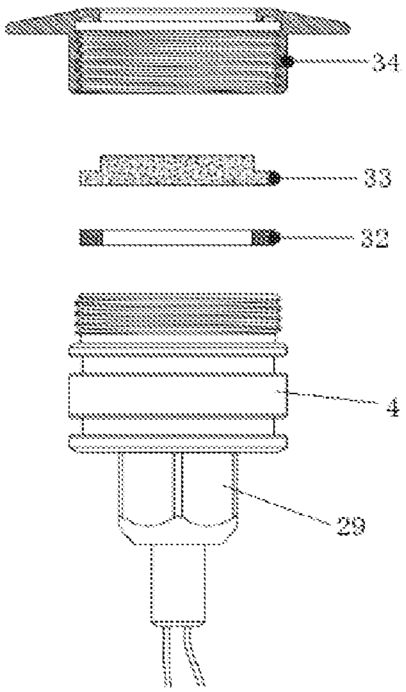
FIG. 6 is a schematic structural diagram of a mask of the present invention.
Figure 7:
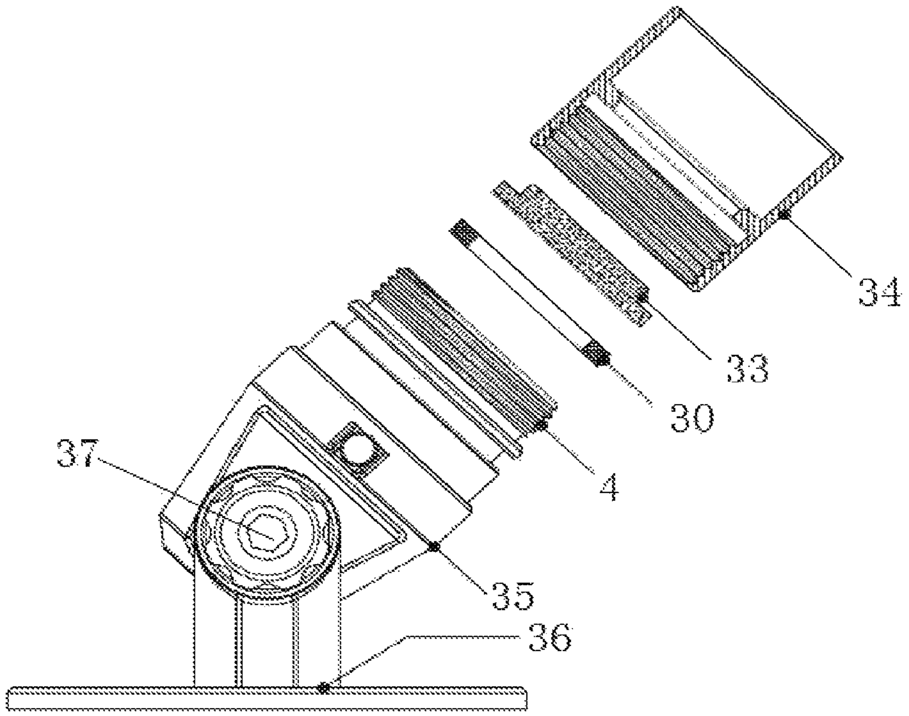
FIG. 7 is a schematic structural diagram of a lamp holder of the present invention.
Figure 8:
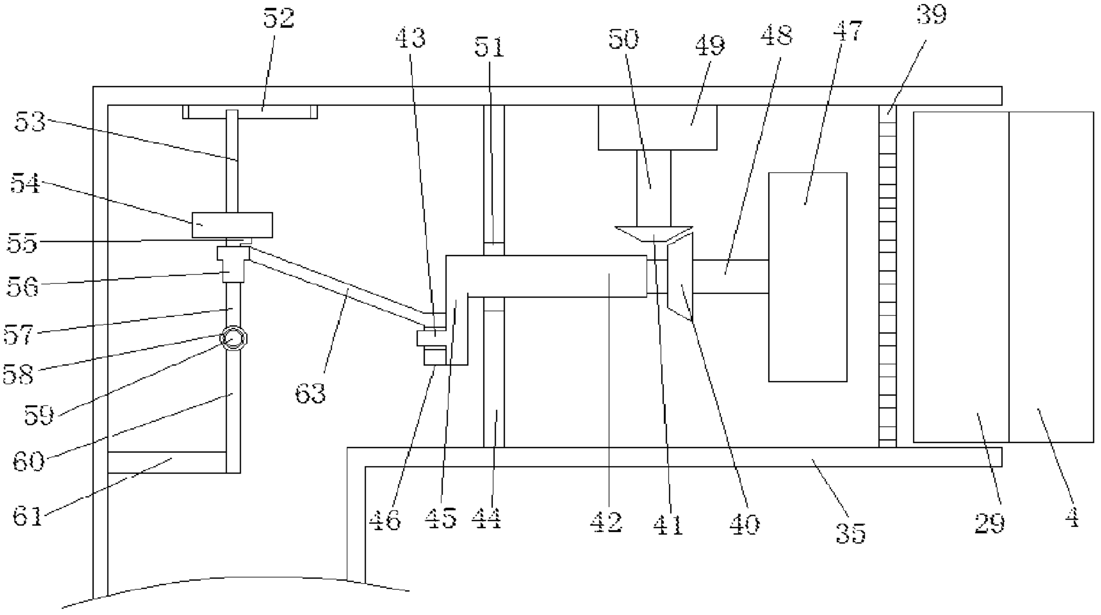
FIG. 8 is a schematic structural diagram of a water pressure adjusting device of the present invention.

As shown in FIG. 6, a circumferential outer wall of an end of the first housing 4 away from the first protruding column 6 is provided with an external thread. The external thread is configured for installing the mask 34. A center of the mask 34 is provided with a through installing hole. An inner bottom of one end of the installing hole away from the first housing 4 is embedded with the stepped glass 33. A side of the stepped glass 33 away from an inner ground of the installing hole is provided with the silicone gasket 32 with a ring structure. The silicone gasket 32 is sleeved on a circumferential outer wall of an end of the external thread of the first housing 4. The mask 34 is any one selected from the group consisting of a flat lid, a curved lid, a round beveled cover, a vertical lamp cover, a long tube cover, and a square beveled cover.

During use, the mask 34 is made of a metal material. The mask 34 is connected by using the outer thread of the circumferential outer wall of the end of the first housing 4 away from the concentric male terminal 3, thereby allowing the mask 34 to condense light of the LED lamp board 1 and protecting the LED lamp board 1, the reflecting cup 13, and the lens 14. The silicone gasket 32 allows the mask 34 and the first housing 4 to achieve the purpose of sealing and waterproofing during installation. The stepped glass 33 is a columnar boss glass with a section of a T-shaped structure as shown in FIG. 6. The stepped glass 33 can reduce the situation that water or water mist enters the first housing 4 from outside the mask 34. Thus, the waterproof performance is improved. The mask 34 can conduct thermal energy of the first housing 4 and further achieve the purpose of heat conducting of the power supply driving module 2 and the LDE lamp board.

As shown in FIGS. 7-13, an end of the second housing 29 away from the first housing 4 is fixed on the lamp holder 35. The lamp holder 35 is fixed on the base 36 by the fixing rod 37. An inner wall of the lamp holder 35 is spirally embedded with the cooling pipeline 38. Both ends of the cooling pipe 38 extend from an end of the lamp holder 35 close to the fixing rod 37 onto the base 36. The water storage cavity 66 is provided in the base 36. An upper surface of the water storage cavity 66 is provided with the water inlet 68 and the water outlet 67. The water inlet 68 is connected to the water inlet pipe 70. The water outlet 67 is connected to the water outlet pipe 69. The water inlet pipe 70 and the water outlet pipe 69 are connected to two open ends of the cooling pipeline 38, respectively. One end of the lamp holder 35 close to the second housing 29 is provided with the ventilation plate 39. One end of the ventilation plate 39 away from the second housing 29 is provided with a fan and a water pressure adjusting device. The fan is provided to be close to the ventilation plate 39. One end of the water pressure adjusting device is connected to a driving device, and the other end is connected to an end of the cooling pipeline 38 close to the water outlet pipe 69. A circumferential outer wall of the water storage cavity 66 is further provided on the water injecting port 71.

The first housing 4 can achieve the purpose of installing with various specifications of lamp holders 35. The lamp holder 35 may have a chandelier structure that is hung on a roof or a cantilever by a lifting ring, or a ceiling structure that is directly installed on the roof or the cantilever by the screw 8. Or, the lamp holder 35 is a floodlight or underwater lamp fixed by the fixing rod 37 and the base 36. When the lamp holder 35 is used as a floodlight or underwater lamp, the base 36 fixes the lamp holder 35 by the fixing rod 37, thereby achieving the purpose of installing and fixing the lamp module group. The cooling pipeline 38 provided in the lamp holder 35 is spirally provided on the inner wall of the lamp holder 35, and therefore the reduction of the temperature in the lamp holder 35 can be achieved. Since the lamp module is installed between the lamp holder 35 and the mask 34, the purpose of heat conduction and heat dissipation for the lamp module group can be achieved by both the lamp holder 35 and the mask 34. Thus, the cooling pipeline 38 can perform water-cooling circulation through the water storage cavity 66 provided in the base 36. In addition, a fan is further provided in the lamp holder 35. The fan blows the ventilation plate 39. The ventilation plate 39 has a circular plate structure. A surface of the circular plate structure is provided with a plurality of spaced ventilation holes. The ventilation holes are beneficial for the wind of the fan to be blown toward an end of the concentric female terminal 7 away from the concentric male terminal 3, and thus the purpose of air cooling the concentric female terminal 7 and the lamp holder 35 is achieved.

As shown in FIGS. 8-13, the fan includes the blade 47, the third rotating shaft 48, and the motor 49. A circumferential outer wall of one end of the third rotating shaft 48 is provided with a plurality of blades 47. The other end of the third rotating shaft 48 is connected to the first rotating shaft 42. A circumferential outer wall of one end of the third rotating shaft 48 close to the first rotating shaft 42 is provided with the first gear 40. The first gear 40 is provided to be engaged with the second gear 41. A center of the second gear 41 is connected to the fourth rotating shaft 50. The fourth rotating shaft 50 is provided to be perpendicular to the third rotating shaft 48. An end of the fourth rotating shaft 50 away from the second gear 41 is connected to a rotating end of the motor 49. An end of the motor 49 away from the fourth rotating shaft 50 is fixed on an inner wall of the lamp holder 35. The first gear 40 and the second gear 41 are provided as bevel gears that are engaged with each other. The fixed disc 44 with a circular structure is provided on the inner wall of the lamp holder 35. The bearing 51 is provided at a center of the fixed disc 44. The bearing 51 is configured to connect the circumferential outer wall of the first rotating shaft 42. The lamp holder 35 has an L-shaped structure. One end of the L-shaped structure is configured for installing the lamp module group, and the other end is configured for installing on the base 36. The circumferential outer wall of the first rotating shaft 42 is provided with the first connecting rod 45. The connecting rod is provided at an end of the first rotating shaft 42 away from the third rotating shaft 48. An end of the first connecting rod 45 away from the first rotating shaft 42 is provided with the fourth protruding column 43. The fourth protruding column 43 is provided on a side of the first connecting rod 45 away from the fixed disc 44. The third shaft sleeve 46 is rotatably connected onto the fourth protruding column 43. The third shaft sleeve 46 is connected to the third connecting rod 63. An end of the third connecting rod 63 away from the third shaft sleeve 46 is provided with the fourth shaft sleeve 56. The fourth shaft sleeve 56 is rotatably connected onto the third protruding column 64. An end of the third protruding column 64 is provided on one side of a second connecting plate 55. The other side of the second connecting plate 55 is fixed on a first connecting plate 54. A side of the first connecting plate 54 away from the second connecting plate is provided with the sliding rod 53. The sliding rod 53 is slidably provided on the slideway 52. The slideway 52 is provided on the inner wall of the lamp holder 35. An end of the second connecting plate 55 is connected to the fourth connecting plate 57. The fourth connecting plate 57 and the third protruding column 64 are provided on the same surface of the second connecting plate 55. An end of the fourth connecting plate 57 away from the second connecting plate 55 is fixed on the first shaft sleeve 58. The first shaft sleeve 58 is fixedly provided on the fifth rotating shaft 59. Both ends of the fifth rotating shaft 59 are rotatably provided on the inner wall of the lamp holder 35. The second shaft sleeve 65 is further fixedly provided on the fifth rotating shaft 59. A circumferential outer wall of the second shaft sleeve 65 is provided with the fifth connecting plate 60. An end of the fifth connecting plate 60 away from the second shaft sleeve 65 is connected to the second connecting rod 61. An end of the second connecting rod 61 away from the second shaft sleeve 65 is fixedly connected to the plunger rod 73. An end of the plunger rod 73 away from the second connecting rod 61 is provided with the movable plug 74. The movable plug 74 is movably provided in the piston pipe 72. The other end of the piston pipe 72 is provided to be in communication with one end of the cooling pipeline 38 close to the water outlet pipe 69. The first check valve 75 and the second check valve 76 are provided on the cooling pipeline 38. The first check valve 75 and the second check valve 76 are provided on both sides of the piston pipe 72, respectively. The fifth connecting plate 60 and the fourth connecting plate 57 are provided on both sides of the fifth rotating shaft 59 along an axial centerline of the fifth rotating shaft 59, respectively. The first shaft sleeve 58 and the second shaft sleeve 65 are provided on the circumferential outer wall of the fifth rotating shaft 59 at an interval. The slideway 52 and the motor 49 are each provided on an inner wall of the same side of the lamp holder 35. An end of the piston pipe 72 close to the second connecting rod 61 is provided with a sealing device. The sealing device is preferably a sealing rubber ring. An outer wall of the sealing device is fixed to an open inner wall of the piston pipe 72. A center of the sealing device is provided with a through hole for the movable plug 74 to move back and forth.

The sliding rod 53, the fourth connecting plate 57, and the fifth connecting plate 60 each are provided in parallel to each other. The planes of the fourth connecting plate 57 and the fifth connecting plate 60 each are provided in parallel to a surface of the fixed disc 44. The third connecting rod 63 is located between the fixed disc 44 and the fourth connecting plate 57, and the third connecting rod 63 is provided to be inclined with respect to the planes of the fourth connecting plate 57 and the fixed disc 44.

The water injecting port 71 is configured to add or discharge water into or from the water storage cavity 66. An open end of the water injecting port 71 is provided with a sealing plug. When the water needs to be added or discharged, the purpose of adding or discharging the water into or from the water storage cavity 66 can be achieved by removing the sealing plug.

The inside of the lamp holder 35 can be air-cooled by using the fan. The water in the water storage cavity 66 can be adsorbed into the cooling pipeline 38 by the water pressure adjusting device, improving the water flow speed of the cooling pipeline 38, achieving the purpose of accelerating the cooling of the cooling pipeline 38, and further making the water in the cooling pipeline 38 cool the heat of the lamp holder 35, the first housing 4 and the second housing 29. Thus, the service life of the lamp module group is improved. During a specific work, the fan is first started to work. After the fan is started to work, the water pressure adjusting device is linked to work. After the water pressure adjusting device works, the fan and the water pressure adjusting device can jointly achieve air cooling and water cooling, thereby achieving the purpose of cooling the lamp module group.

Its working principle is as follows: the motor 49 is connected to a power supply through the wire 9. When the power supply is started, the motor 49 and the lamp module are separately started. After the motor 49 is started, the fourth rotating shaft 50 rotates. After the fourth rotating shaft 50 rotates, the first gear 40 is driven to rotate. The first gear 40 rotates and then engages with the second gear 41 to rotate. The second gear 41 rotates and then drives the third rotating shaft 48 and the first rotating shaft 42 to rotate. The third rotating shaft 48 rotates and then drives the blade 47 to rotate. The blade 47 rotates to achieve blowing. The wind of the blade 47 is blown toward the second housing 29 via the ventilation plate 39, so that the purpose of air cooling the second housing 29 is achieved.

After the first rotating shaft 42 rotates, the first connecting rod 45 is driven to rotate. The first connecting rod 45 rotates, allowing the fourth protruding column 43 on the first connecting rod 45 to make a circular motion around the axial centerline of the first rotating shaft 42, thereby driving the third connecting rod 63 fixedly provided on the third shaft sleeve 46 to rotate, and then the third connecting rod 63 makes a circular motion along with it.

Figure 9:
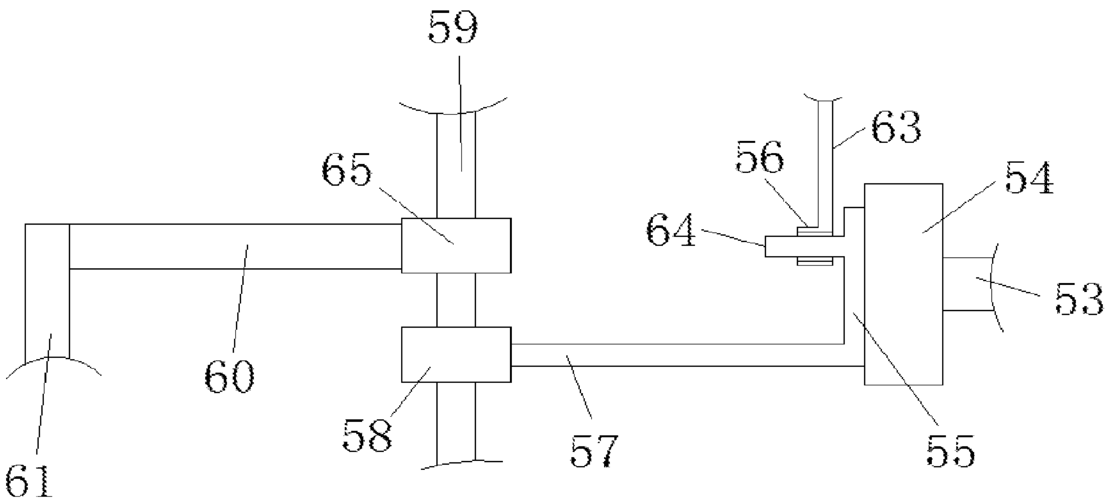
FIG. 9 is a schematic structural diagram of a top view of a water pressure adjusting device of the present invention.
Figure 10:
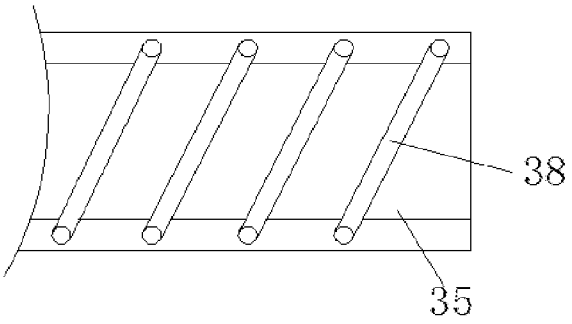
FIG. 10 is a schematic structural diagram of a cooling pipeline of the present invention.
Figure 11:
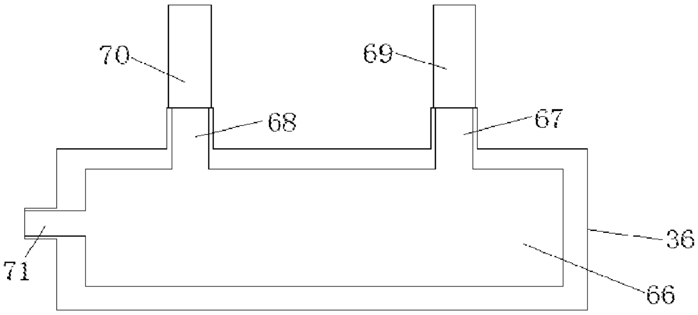
FIG. 11 is a schematic structural diagram of a water storage cavity of the present invention.

An end of the third connecting rod 63 away from the first connecting rod 45 is rotatably provided on the third protruding column 64. The third protruding column 64, the first connecting plate 54, and the second connecting plate 55 each are fixedly connected. The other end of the fourth connecting plate 57 is fixed to the circumferential outer wall of the fifth rotating shaft 59 through the first shaft sleeve 58. Both ends of the fifth rotating shaft 59 are rotatably provided on the inner wall of the lamp holder 35. Thus, the third connecting rod 63 allows the first connecting plate 54 and the second connecting plate 55 to swing. The sliding rod 53 connected to the first connecting plate 54 moves back and forth on the slideway 52, and drives the fifth rotating shaft 59 to rotate back and forth. The fifth rotating shaft 59 rotates back and forth, and then drives the second shaft sleeve 65 and the fifth connecting plate 60 to swing back and forth. The fifth connecting plate 60 swings, and then drives the second connecting rod 61 in FIG. 8 to move left and right. The second connecting rod 61 in FIG. 9 is shown to move up and down.

Figure 12:
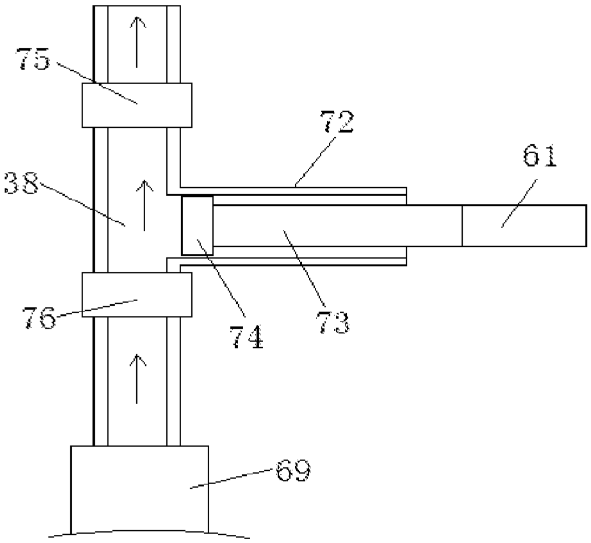
FIG. 12 is a schematic structural diagram of a connection between a plunger pipe and a cooling pipeline of the present invention.
Figure 13:
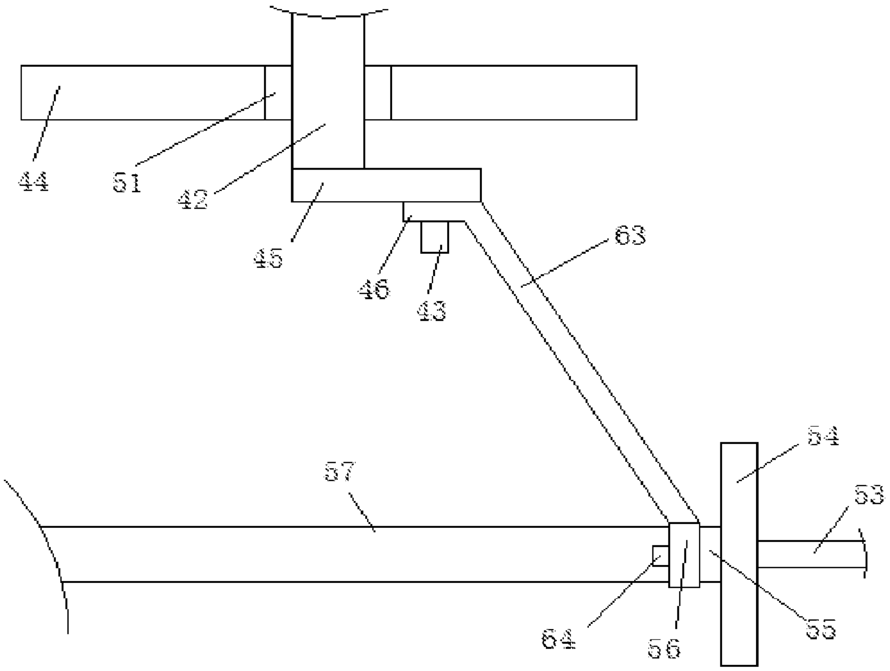
FIG. 13 is a schematic structural diagram of a connection between a third connecting rod, a third shaft sleeve, and a fourth shaft sleeve of the present invention.

An end of the second connecting rod 61 away from the fifth connecting plate 60 is fixedly connected to the plunger rod 73. The plunger rod 73 also moves back and forth, thereby allowing the movable plug 74 to move back and forth in the piston pipe 72. When the movable plug 74 moves back and forth in the piston pipe 72, the air pressure in the piston pipe 72 will change. In FIG. 12, when the plunger rod 73 moves to the right, the second check valve 76 is opened and the first check valve 75 is closed. The water in the water storage cavity 66 is introduced into the cooling pipeline 38 between the first check valve 75 and the second check valve 76 via the water outlet 67 and the water outlet pipe 69, and fully fills the cooling pipeline 38 located between the first check valve 75 and the second check valve 76. When the plunger rod 73 moves to the left, the second check valve 76 is closed and the first check valve 75 is opened. The water in the cooling pipeline 38 located between the first check valve 75 and the second check valve 76 is pressurized and flows from the first check valve 75 to the other end of the cooling pipeline 38. The repeat allows the water in the water storage cavity 66 to intermittently flow into the cooling pipeline 38 via one end of the cooling pipeline 38, and then flow back to the water storage cavity 66 via the other end of the cooling pipeline 38, thereby achieving the purpose of circulating the water in the cooling pipeline 38. The cooling efficiency can be accelerated, so that the lamp module can achieve the purpose of accelerated cooling.

Obviously, those skilled in the art can make various modifications and variations on the present invention without departing from the spirit and scope of the present invention. So, if these modifications and variations of the present invention fall within the scope of the claims in the present disclosure and their equivalent techniques, the present invention is also intended to include these modifications and variations.

What is claimed is:

1. A lighting assembly comprising:

a lamp module group comprising:

- a first housing defining a protruding column, the first housing defining a cavity, the first housing defining a housing opening to the cavity defined at a first housing end of the first housing, the first housing end positioned opposite from the protruding column;
- a power supply driving module positioned within the cavity;
- the lamp module group comprises a light-emitting diode ("LED") lamp board positioned within the cavity, the LED lamp board is configured to emit light through the housing opening of the housing;
- a mask coupled to the first housing end, the mask configured to direct light emitted from the LED lamp board,
- a lens secured to the first housing end by the mask, the lens at least partially enclosing the cavity, and
- a first concentric terminal connected in electrical communication with the power supply driving module, the first concentric terminal extending through the protruding column; and a second housing comprising a second concentric terminal, the second housing receiving a portion of the first housing, the second concentric terminal connected in electrical communication with the first concentric terminal, the second concentric terminal configured to supply power to the power supply driving module through the first concentric terminal.

2. The lighting assembly of claim 1, wherein the second housing threadedly engages the protruding column, and wherein the second housing is coupled to the first housing.

3. The lighting assembly of claim 1, wherein:

the second housing is a lamp holder;

the lamp holder is secured to a base by a fixing rod; and the lamp holder is rotatable about the fixing rod relative to the base.

4. The lighting assembly of claim 1, wherein the mask is one of a flat lid, a curved lid, a round beveled cover, a vertical lamp cover, a long tube cover, and a square beveled cover.

5. The lighting assembly of claim 1, wherein the first concentric terminal comprises:
- an outer conductive pipe connected in electrical communication with the power supply driving module by a first wire;
- an inner conductive pipe positioned within the outer conductive pipe, the inner conductive pipe connected in electrical communication with the power supply driving module by a second wire; and
- an insulating column positioned between the inner conductive pipe and the outer conductive pipe.

6. The lighting assembly of claim 1, wherein the second concentric terminal comprises:
- a conductive ring connected to a first wire; and
- a conductive post connected to a second wire, the conductive post positioned within and spaced apart from the conductive ring.

7. The lighting assembly of claim 1, wherein:
- the first concentric terminal comprises an outer conductive pipe and an inner conductive pipe;
- a conductive ring of the second concentric terminal is positioned between the outer conductive pipe and the inner conductive pipe; and
- a conductive post of the second concentric terminal is received within the inner conductive pipe.

8. The lighting assembly of claim 1, wherein the mask is threadedly engaged with the first housing end.

9. A method for assembling a lighting assembly, the method comprising:
- attaching a mask to a first housing of a lamp module group to redirect light emitted from an LED lamp board of the lamp module group, the LED lamp board positioned within a cavity defined by the first housing, the LED lamp board configured to emit light through a housing opening defined at a first housing end of the first housing; and
- attaching a second housing to a protruding column of the first housing to supply power to a first concentric terminal of the lamp module group from a second concentric terminal of the second housing, comprising:
  - inserting an outer conductive pipe and an inner conductive pipe of the first concentric terminal between a conductive ring and a conductive post of the second concentric terminal to form a first electrical connection between the outer conductive pipe and the conductive ring; and
  - inserting the conductive post into the inner conductive pipe to form a second electrical connection between the conductive post and the inner conductive pipe, the first concentric terminal extending through the protruding column.

10. The method of claim 9, wherein the second housing is a lamp holder, and wherein the method further comprises tilting the lamp holder relative to a base about a fixing rod to redirect light emitted from the lamp module group, the fixing rod rotatably securing the lamp holder to the base.

11. The method of claim 9, wherein the mask is one of a flat lid, a curved lid, a round beveled cover, a vertical lamp cover, a long tube cover, and a square beveled cover.

12. The method of claim 9, wherein the mask is a first mask, and wherein the method further comprises replacing the first mask with a second mask to change a pattern of light emitted from the lamp module group.

13. The method of claim 9, wherein the second concentric terminal is connected in electrical communication with a power cord.

14. The method of claim 9, wherein the lamp module group further comprises a power supply driving module connected in electrical communication with the first concentric terminal and the LED lamp board.

15. A lighting assembly comprising:
- a lamp module group comprising:
  - a first housing defining a protruding column, the first housing defining a cavity, the first housing defining a housing opening to the cavity positioned opposite from the protruding column;
  - a power supply driving module positioned within the cavity; and
  - a first concentric terminal connected in electrical communication with the power supply driving module, the first concentric terminal extending through the protruding column, the first concentric terminal comprising an outer conductive pipe and an inner conductive pipe; and
- a second housing comprising a second concentric terminal, the second concentric terminal comprising a conductive ring and a conductive post, the conductive ring positioned between the outer conductive pipe and the inner conductive pipe, the conductive post received within the inner conductive pipe, the second housing receiving a portion of the first housing, the second concentric terminal connected in electrical communication with the first concentric terminal, the second concentric terminal configured to supply power to the power supply driving module through the first concentric terminal.

16. The lighting assembly of claim 15, wherein the second housing threadedly engages the protruding column, and wherein the second housing is coupled to the first housing.

17. The lighting assembly of claim 15, wherein:
- the lamp module group comprises a light-emitting diode ("LED") lamp board positioned within the cavity; and
- the LED lamp board is configured to emit light through the housing opening of the housing.

18. The lighting assembly of claim 17, wherein:
- the housing opening is defined at a first housing end of the first housing;
- the first housing end is positioned opposite from the protruding column;
- the lamp module group further comprises a mask threadedly engaged with the first housing end; and
- the mask is configured to direct light emitted from the LED lamp board.

19. The lighting assembly of claim 18, wherein a lens is secured to the first housing end by the mask, and wherein the lens at least partially encloses the cavity.

20. The lighting assembly of claim 18, wherein the mask is one of a flat lid, a curved lid, a round beveled cover, a vertical lamp cover, a long tube cover, and a square beveled cover.

* * * * *